(12) United States Patent
Seybold et al.

(10) Patent No.: US 8,751,272 B1
(45) Date of Patent: Jun. 10, 2014

(54) FARE COMPARE—A SYSTEM FOR COLLECTING AND DISPLAYING PRICE INFORMATION

(75) Inventors: Charles A. Seybold, Redmond, WA (US); Jon P. Zimmerman, Seattle, WA (US)

(73) Assignee: Expedia, Inc., Bellevue, WA (US)

( * ) Notice: Subject to any disclaimer, the term of this patent is extended or adjusted under 35 U.S.C. 154(b) by 1826 days.

(21) Appl. No.: 09/406,959

(22) Filed: Sep. 28, 1999

Related U.S. Application Data

(60) Provisional application No. 60/144,711, filed on Jul. 20, 1999.

(51) Int. Cl.
  *G06Q 10/00* (2012.01)
  *G06Q 50/00* (2012.01)

(52) U.S. Cl.
  USPC .................. 705/6; 705/5; 705/1.1; 705/7.29

(58) Field of Classification Search
  USPC ............ 705/5, 26, 227, 37, 1, 6, 22, 27, 1.1, 705/7.29; 701/201, 208, 211; 295/226, 228, 295/238; 340/825.3
  See application file for complete search history.

(56) References Cited

U.S. PATENT DOCUMENTS 5,644,721 A * 7/1997 Chung et al. ...................... 705/6
5,732,398 A * 3/1998 Tagawa ............................. 705/5

(Continued)

FOREIGN PATENT DOCUMENTS

GB 2310058 * 8/1997

OTHER PUBLICATIONS

Walker, J. "System . . . Flexibility", abstract, Jul. 22, 1999.*

(Continued)

*Primary Examiner* — Dean T Nguyen
(74) *Attorney, Agent, or Firm* — Knobbe, Martens, Olson and Bear, LLP

(57) ABSTRACT

A service for pricing items of inventory contained in a searchable database is available for access via the Internet. Where multiple items can satisfy a consumer's request, it is typical for a service to perform an inventory search for items that match a consumer's request. When the inventory is stored in an inventory database, the inventory database is queried for the purpose of retrieving a result set which matches the consumer's request. A separate fare server database containing inventory recently known to be available, located local to the Internet server for fast and efficient access, can also be provided for performing searches related to the consumer's request. Some inventory, even though recently known to have been available, is filtered out before being stored in the fare server database and inventory is removed when outdated, no longer available or purchased. Searches that are less specific than the search performed in the inventory database based on the consumer request can be performed in the fare server database to retrieve information about similar inventory. In addition to displaying the result set from the inventory database to the consumer, a market summary can be presented to the consumer that reflects information concerning similar inventory. Information from the searches in the fare server database forms the basis for providing the market summary. A consumer is also given the option to purchase the similar inventory returned from the fare server database. As a result, a consumer is not only more informed about the market for which a purchase is being considered, but also has the additional option to purchase similar inventory. A consumer can also directly query the fare server database for flexible searching and for fast and efficient access to market information. The fare server database can be used for multiple client services.

17 Claims, 29 Drawing Sheets

(56) References Cited

U.S. PATENT DOCUMENTS

| | | | |
|---|---|---|---|
| 5,897,620 A * | 4/1999 | Walker et al. | 705/5 |
| 5,948,040 A * | 9/1999 | DeLorme et al. | 701/201 |
| 5,953,706 A * | 9/1999 | Patel | 705/6 |
| 6,134,534 A * | 10/2000 | Walker et al. | 705/26 |
| 6,295,521 B1 * | 9/2001 | DeMarcken et al. | 705/6 |
| 6,304,850 B1 * | 10/2001 | Keller et al. | 705/5 |
| 6,418,441 B1 * | 7/2002 | Call | 1/1 |
| 6,442,526 B1 * | 8/2002 | Vance et al. | 705/5 |
| 6,477,503 B1 * | 11/2002 | Mankes et al. | 705/5 |
| 6,505,172 B1 * | 1/2003 | Johnson et al. | 705/27 |
| 2002/0100802 A1 * | 8/2002 | Sehr | 235/384 |

OTHER PUBLICATIONS

Pho, H.M. "Online Reservation system and method", abstract, Aug. 16, 1999.*

Koepper, Ken "Room Inventory . . . CRS Generation", Lodging, Jan. 1990, pp. 26-29.*

Tice, K. "Real Time Airfares", Tour & Travel News, p1, Dec. 15, 1997, pp. 1-2, Dialog 16:05379512.*

Frederick, J. "Fare values . . . travel deals", Money, v27n4, pp. 183-184, Apr. 1998, Dialog 15:01597834.*

* cited by examiner

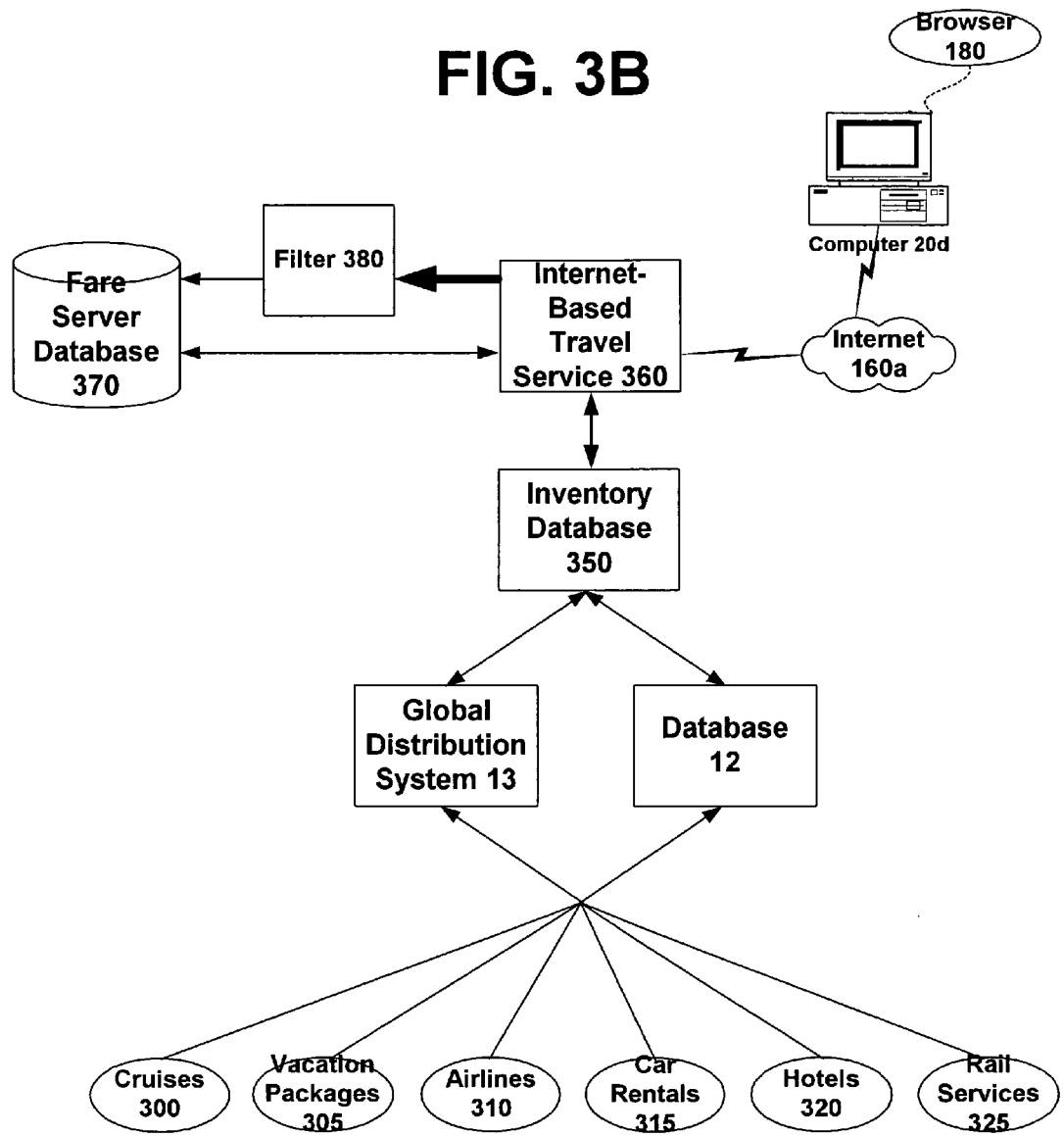

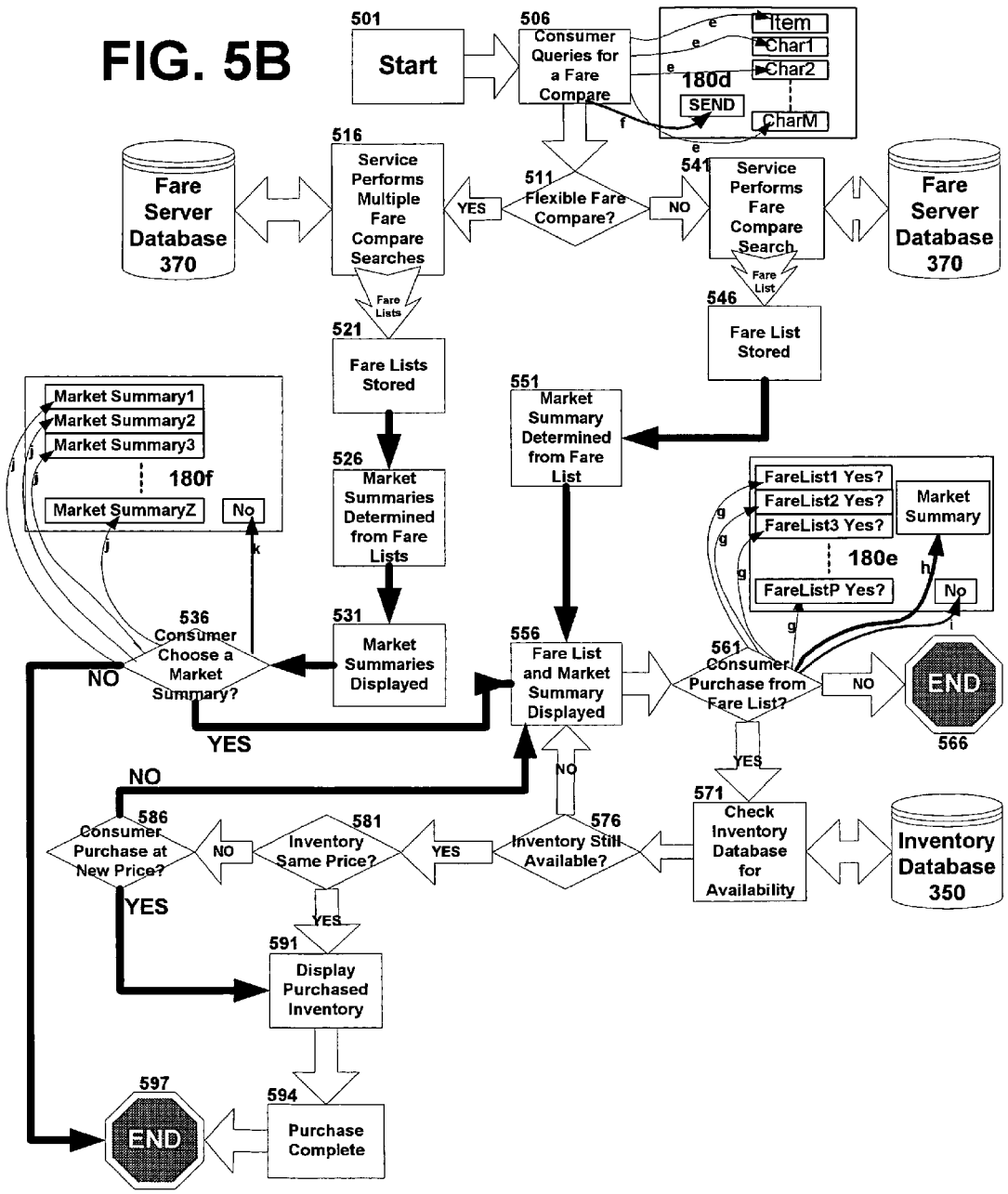

Roundtrip search - Microsoft Internet Explorer provided by ITG

| Home Page | My Travel | Deals | Places To Go | Interests & Activities | Maps | Find | Help |

My Travel

Type of search
- Round trip
- One way
- Multiple airports
- Timetable search
- Arrival/Departure Info
- Fare Compare 50% off your next American Airlines flight!

OPTIONS
* My search history
* Cancel
  Go to My Travel Highlights

QUESTIONS?
* Is it safe to buy online?
* Other FAQ's

Flight Wizard    My Itineraries   My Profile — 610

Roundtrip search

Before you search, read our Insider's Shopping Tips. If your dates are flexible, try Fare Compare. To save your search results, try Search History.

Where and when do you want to travel?

Type city and state/province, or city and country, or airport name, or airport code.

From:
[Seattle, WA (SEA-Seattle Tacoma)] —701

To:
[Chicago, IL (ORD-O'Hare)] —702

Departing: (MM/DD/YY)    Time:
703a [6/15/1999]    [10:00 AM] —703b    600b

Returning: (MM/DD/YY)    Time:
704a [6/19/1999]    [8:00 PM] —704b

*Tip: If your plans are flexible, try the new improved Fare Compare. It tells you when to fly to get the most for your money.*

Who is going on this trip?

705a [1]   Adults (age 12 to 64)
705b [0]   Seniors (age 65 and over)
705c [0]   Children (age 2 to 11)
705d [0]   Infants (under age 2 at time of travel)

705e ○ in a reserved seat
      ● without a reserved seat (in an adult's lap)

Do you have any preferences?

Class
706a [Economy / Coach ▼]

Search options
Leave these boxes unchecked to increase your chances of finding lower fares.
706b ☐ Only direct flights.
706c ☐ No change penalties after purchase.
706d ☐ No advance purchase restrictions.

Airline
Search all airlines, or narrow your search to a preferred airline.
706e [Search All Airlines ▼]

Start your search?

707 — Search by best available fares.
When price is your priority, we'll show you the best fares we can find as close as possible to your arrival and departure times. If you get good fares but bad times, try searching based on departure time.

| Home Page | My Travel | Deals | Places To Go | Interests & Activities | Maps | Find | Help |

My Travel

Flight Wizard  📋 My Itineraries  👤 My Profile

Type of search
- Round trip
- One way
- Multiple airports
- Timetable search
- Arrival/Departure info
- Fare Compare
- Airline Fare List

Deals found by other Expedia.com customers

Here are the most popular destinations from your airport. If your destination is not listed, check the airlines' published fares in the Airline Fare List.

Departing from Seattle, WA (SEA)

| Destination | Deal Range |
|---|---|
| Acapulco, Mexico (ACA-Juan N. Alvarez) | $398 - $436 |
| Albuquerque, NM (ABQ-Albuquerque Intl.) | $176 - $1487 |
| Amsterdam, Netherlands (AMS-Schiphol) | $844 - $4195 |
| Atlanta, GA (ATL-Hartsfield Intl.) | $379 - $1880 |
| Baltimore, MD (BWI-Baltimore Washington) | $208 - $830 |
| Boston, MA (BOS-Logan Intl.) | $451 - $1931 |
| Brussels, Belgium (BRU-National) | $753 - $778 |
| Charlotte, NC (CLT-Douglas Intl.) | $298 - $1623 |
| Chicago, IL (ORD-O'Hare) | $257 - $1799 |
| Cincinnati, OH (CVG-Cincinnati N. Ky.) | $322 - $1824 |
| Cleveland, OH (CLE-Hopkins Intl.) | $208 - $1296 |
| Dallas, TX (DFW-Dallas-Fort Worth) | $312 - $1072 |
| Denver, CO (DEN-Denver Intl.) | $276 - $2096 |
| Detroit, MI (DTW-Wayne County) | $218 - $1699 |
| Dublin, Ireland (DUB-Dublin) | $744 - $1072 |
| Fort Lauderdale, FL (FLL) | $218 - $859 |
| Frankfurt, Germany (FRA-Frankfurt Intl.) | $605 - $2528 |
| Hartford, CT (BDL-Bradley Intl.) | $439 - $1910 |
| Hong Kong, China (HKG-Hong Kong Intl.) | $1011 - $1448 |
| Honolulu, Oahu, HI (HNL-Honolulu Intl.) | $478 - $1165 |
| Indianapolis, IN (IND-Indianapolis Intl.) | $208 - $454 |

OPTIONS
- Change all search options
- Find more flights
  Use the Flight Wizard to search for more flights
- Cancel
  Go to My Travel Highlights

QUESTIONS?
- Is it safe to buy online?
- Other FAQ's

Interested in other destinations or options?

➔ Try using Airline Fare List
See the lowest round-trip fares published by the airlines. These fares may not be available on the days you wish to travel. Please read the rules for each fare carefully.

➔ Try using Round Trip Search instead
Broaden your choice of airports and flights or change class of service or preferred airline. Use our Round trip search to find and book the best priced trips to all most any destination around the world.

FIG. 8C

| | | | | |
|---|---|---|---|---|
| Home Page | My Travel | Deals | Places To Go | Interests & Activities | Maps | Find | Help |

My Travel  Flight Wizard  📁 My Itineraries  👤 My Profile

Deals found by other Expedia.com customers

Prices range from $135 to $295 in this market, the best prices are usually further out. If you are interested in seeing the airlines' published fares, see the Airline Fare List. —845

— 819

Seattle, WA (SEA) – Las Vegas, NV (LAS) 823 — 822

Flights departing between: 7/26/1999 [▼] and 2/1/2000 [▼]

Sort flights by: ● Date ○ Price  824  [ Go ] 825

Type of search (870)
- Round trip
- One way
- Multiple airports
- Timetable search
- Arrival/Departure info
- Fare Compare
- Airline Fare List

819

OPTIONS
* Next set of fares
* Previous set of fares
* Find more flights
  Use the Flight Wizard to search for more flights
* Cancel
  Go to My Travel Highlights

LEGEND
☆ Best deals found by other customers for this route. (827)

QUESTIONS?
* Is it safe to buy online?
* Other FAQ's

| Departure/Return | Length | Airline | Lowest fare |
|---|---|---|---|
| Sun 1-Aug / Tue 3-Aug | 2 days | America West Airlines | $921 |
| Sun 1-Aug / Tue 3-Aug | 2 days | America West Airlines | $924 |
| Sun 1-Aug / Tue 3-Aug | 2 days | Delta | $1194 |
| Sun 1-Aug / Tue 3-Aug | 2 days | Continental | $1260 |
| Sun 1-Aug / Tue 3-Aug | 2 days | Northwest | $1270 |
| Sun 1-Aug / Tue 3-Aug | 2 days | Delta | $1880 |
| Sun 1-Aug / Fri 6-Aug | 5 days | America West Airlines | $924 |
| Sun 1-Aug / Fri 6-Aug | 5 days | Delta | $1194 |
| Sun 1-Aug / Fri 6-Aug | 5 days | United Airlines | $1432 |
| Sun 1-Aug / Sun 15-Aug | 14 days | Northwest | $463 ☆ |
| Sun 1-Aug / Sun 15-Aug | 14 days | Frontier Airlines | $571 ☆ |
| Sun 1-Aug / Sun 15-Aug | 14 days | Continental | $774 |
| Sun 1-Aug / Sun 15-Aug | 14 days | America West Airlines | $924 |
| Sun 1-Aug / Sun 15-Aug | 14 days | United Airlines | $1181 |
| Mon 2-Aug / Wed 4-Aug | 2 days | Northwest | $612 ☆ |
| Mon 2-Aug / Wed 4-Aug | 2 days | Frontier Airlines | $616 ☆ |
| Mon 2-Aug / Wed 4-Aug | 2 days | Continental | $671 |
| Mon 2-Aug / Wed 4-Aug | 2 days | Continental | $671 |
| Mon 2-Aug / Wed 4-Aug | 2 days | United Airlines | $904 |

826 / 630d / 836

Select an option

837 — ⊙ Next set of fares (leave later)
838 — ⊙ Previous set of fares (leave earlier)
839 — ⊙ Use Round trip search to find your own deals for any dates
       ⊙ Change airports
840 — ⊗ Cancel and go to My Travel Highlights

FARE COMPARE—A SYSTEM FOR COLLECTING AND DISPLAYING PRICE INFORMATION

CROSS-REFERENCE TO RELATED APPLICATION

This application claims priority to and the benefit of the filing date of copending provisional application No. 60/144,711, filed Jul. 20, 1999, entitled "Fare Compare—A System for Collecting and Displaying Price Information."

FIELD OF THE INVENTION

The present invention relates to a network-based service for pricing items of dynamic inventory contained in a database.

BACKGROUND OF THE INVENTION

Brief Description of Prior Developments

There has recently been a tremendous growth in the number of computers connected to the Internet. A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol. The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document contains text and metadata (commands providing formatting information), as well as embedded links that reference other data or documents. The referenced documents may represent text, graphics, or video.

A Web browser is a client application or, preferably, an integrated operating system utility that communicates with server computers via FTP, HTTP and Gopher protocols. Web browsers receive electronic documents from the network and present them to a user.

An intranet is a local area network containing Web servers and client computers operating in a manner similar to the World Wide Web described above. Typically, all of the computers on an intranet are contained within a company or organization.

The present invention relates to a service for pricing items of inventory contained in a searchable database, and most preferably to an Internet-based service such as an Internet-based travel service offering airline tickets, hotel rooms, rental cars, etc., to customers. With such a service, a consumer, using a computer connected to the travel service via the Internet, can purchase items from a dynamically changing inventory including airline tickets, rental car services and hotel rooms. Typically, a travel service cooperates with a centralized global distribution system (GDS). A GDS is a system/service that communicates with travel agents for the purpose of providing up to date fare, schedule and availability information in response to a query. This information is provided to the GDS by the suppliers, typically through third parties; however, a travel service can also cooperate with other databases, such as a local database reflecting specific relationships between suppliers and the travel service, such as discount contracts or incentive programs. Accordingly, an Internet-based service can have access to many sources of supplier inventory and prices.

The nature of some markets is such that price fluctuations or changes can be common. For example, the environment of a travel service is such that there are numerous ways of providing the same or a similar end product to the consumer at a variety of prices. Due to supplier driven preferences, it can be cost effective to price similar inventory differently. For example, in the case of airline reservations, the number of ways that a consumer can travel from point A to point B is great when the number of airline carriers, different travel paths, hub locations and other particulars are considered. For this reason, the price of a particular generic segment from point A to point B may vary considerably across time, airline carriers, and the like. Further compounding price variations are price sensitivities, which can reflect, e.g., an increase in demand for tickets reserved proximate to departure time. A supplier can also take part in competitive price maneuvering to try to increase market share and secure repeat customers. Additionally, incentive and discount programs negotiated with individual airlines can further affect the price offered by a travel service. Also, certain classes of inventory may have associated high or low demands, or high or low volume sales.

In addition, there are numerous consumer driven preferences which can affect pricing as well. Market research, among other methods, can reveal that some consumers will value individual characteristics of a given item of inventory differently. For example, in the case of airline tickets, one consumer may not value when the flight takes place whereas another consumer may value a particular carrier over all others. These consumer preferences are sometimes factored into offered prices when these preferences are reasonably known. For these reasons and others, there are numerous factors that can affect the end price of the same or similar end product.

With this background, when both consumer driven and supplier driven preferences are taken into account, the result is that the prices of the same or similar items of inventory can vary widely. In such a dynamic market, the consumer is often at a loss for information as to the variance or volatility of the market. Even the most sophisticated consumer can not be charged with knowledge of rapidly changing markets such as airfares because there are too many simultaneous factors to consider.

For example, in a conventional Internet-based travel service, a consumer enters very specific information concerning desired supplier inventory, and the Internet-based travel service queries a GDS for inventory that matches that specific query. The GDS performs a search of its database to find matches for the query and returns a result set to the Internet-based travel service for viewing by the consumer. However, a traditional GDS search in response to a query is limited in at least two ways.

The first limitation results from the fact that there are numerous ways of providing the same end product to the consumer. For example, there are an incalculable number of ways to travel from point A to point B when different suppliers, travel routes, and other particulars are considered. Thus, for economic reasons, the GDS typically spends a fixed amount of time searching its database for information fulfilling the query. Consequently, when a GDS returns a result set to a travel service in response to a query, the GDS returns a very limited result set for that particular query simply because not every permutation or combination of possible inventory can be searched. As a result, some inventory that matches the query does not appear in the result set returned by the GDS. Thus, it would be advantageous to supplement the GDS results with information regarding inventory recently known to have been available.

The second limitation of a GDS search results from the fact that the query itself must be specific even though consumers do not always value the specificity of the query. For example, a consumer may be flexible as to a return date or time, yet a traditional Internet-based travel service still requires a user to enter a return date. Accordingly, the result set returned by the GDS only contains inventory matching the return date entered by the user. Yet, there may be inventory with a return date of one day earlier that is more desirable to the consumer (e.g., because it is less expensive). The consumer would need to perform additional searches and thus consume extra time to satisfy the flexibility.

Further, although a consumer may desire a particular return date and thus enter a specific return date to the Internet-based travel service, the same consumer may be willing to leave a day earlier or later if more desirable items of inventory are not only available but also made known to the consumer. In a traditional Internet-based travel service, there is no mechanism to display inventory that may be more desirable than consumer specified inventory because a search is performed for only consumer specified inventory. Additional specific queries could be performed and these additional result sets could be gathered, but, as mentioned, multiple searches by the GDS can be costly in terms of time and computing power.

Thus, it would be beneficial to provide a service capable of relaxing query requirements without incurring substantial or prohibitive increases in GDS search time and computing power. Additionally, it would be beneficial to provide a way for the consumer to gauge whether a relaxed search might result in more desirable inventory being located and presented. It would thus be beneficial to display the results of a relaxed search, or a summary thereof, to the consumer to provide insight into market conditions concerning similar inventory. With this extra insight, a consumer can make an informed decision about the relative bargain or bargains being offered. It may be, for example, that there is a flight leaving a day earlier that is substantially less expensive than flights matching the consumer's query. Accordingly, if the consumer can be shown the range of prices for similar inventory, not necessarily matching the consumer's query, the consumer can benefit greatly. The provision of such a benefit would enrich the consumer experience and consequently could attract additional consumers and secure repeat customers.

Presently, services linked to a searchable database, such as a global distribution system, do not address these failings. Thus, for a given dynamic inventory, it would be advantageous to provide to a consumer information regarding market conditions for inventory relating to a database query.

SUMMARY OF THE INVENTION

The present invention relates to a service for pricing items of inventory contained in a searchable database. Where multiple items can satisfy a consumer's request, it is typical for a service to perform an inventory search for items that match the consumer's request. When the inventory is stored in an inventory database, the inventory database is queried for the purpose of retrieving a result set which matches the consumer's request. A separate fare server database containing inventory recently known to be available, located local to the Internet server for fast and efficient access, can also be provided for performing searches related to the consumer's request. Some inventory, even though recently known to have been available, is filtered out before being stored in the fare server database and inventory is removed when outdated, no longer available or purchased. Searches that are less specific than the search performed in the inventory database based on the consumer request can be performed in the fare server database to retrieve information about similar inventory. In addition to displaying the result set from the inventory database to the consumer, a market summary can be presented to the consumer that reflects information concerning similar inventory. Information from the searches in the fare server database forms the basis for providing the market summary. A consumer is also given the option to purchase the similar inventory returned from the fare server database. As a result, a consumer is not only more informed about the market for which a purchase is being considered, but also has the additional option to purchase similar inventory. A consumer can also directly query the fare server database for flexible searching and for fast and efficient access to market information. The fare server database can be used for multiple client services.

Other features of the present invention are described below.

DETAILED DESCRIPTION OF THE DRAWINGS

The technique for providing information about similar inventory is further described with reference to the accompanying drawings in which:

FIG. 3B is a block diagram of an Internet-based travel service in communication with both a global distribution system and another inventory database in accordance with the present invention.

FIG. 5B is a flow chart of an alternate course for pricing inventory in accordance with the present invention.

FIG. 7A is an example of a round trip query Web page and corresponding user interface in accordance with the present invention.

FIG. 7C is an example of a fare compare query Web page and corresponding user interface in accordance with the present invention.

FIG. 7F is an example of a fare list Web page and corresponding user interface in accordance with the present invention.

FIG. 7J is an example of a purchasing Web page and corresponding user interface in accordance with the present invention.

FIG. 8C is an illustration of a Web page presenting market summary information for multiple markets in accordance with a second embodiment of the present invention.

FIG. 8D is an illustration of a Web page presenting fare information in response to a fare compare query in accordance with a second embodiment of the present invention.

FIG. 8F is an illustration of an error message Web page in accordance with a second embodiment of the present invention.

DETAILED DESCRIPTION OF PREFERRED EMBODIMENTS

Overview

Figure 1:
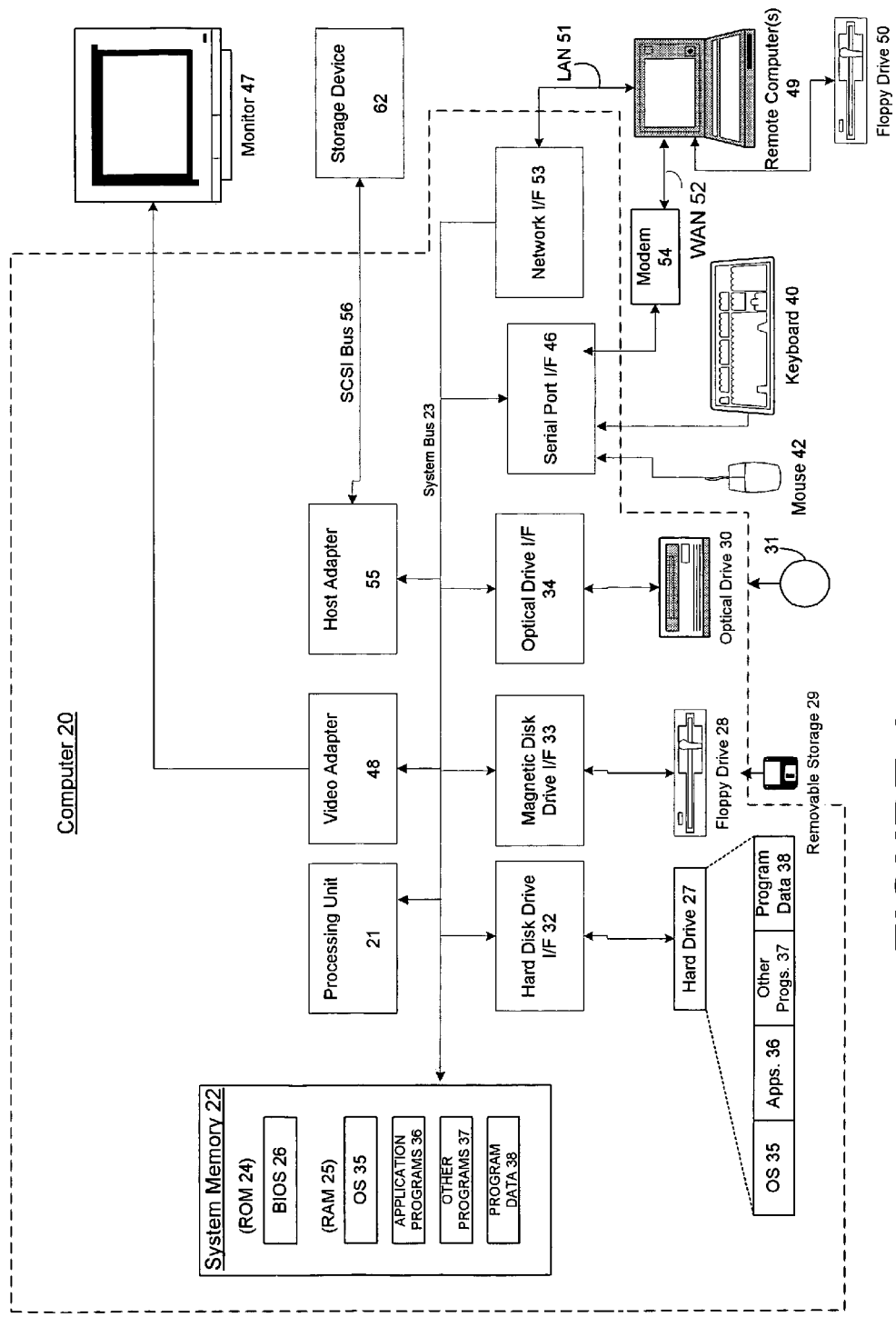
FIG. 1 is a block diagram representing a general purpose computer system in which aspects of the present invention may be incorporated.

As discussed above, the present invention was developed in part to provide an improved, computer-based system for pricing dynamic inventory that displays a market summary for inventory similar to consumer specified inventory, and that gives the consumer the option to purchase the similar inventory. A consumer can quickly gauge the market in which inventory is being sought, thus providing the service with a competitive advantage over services not offering market information. For example, a fare server database can be provided that stores inventory recently known to be available. In addition to making an ordinary query to an inventory database in response to consumer specified information regarding inventory for possible purchase, several other related queries can be made to the fare server database. Since the fare server database can be accessed quickly and efficiently, a request or requests can be made to the fare server database that are similar to the consumer specified request but have at least one relaxed search parameter. Information from the results of the relaxed searches is used to display information about the market or about multiple markets to the consumer. A consumer can also purchase inventory resulting from the searches of the fare server database. A consumer can also directly query the fare server database for relaxed searching and for fast and efficient access to market information.

The need for a system that can provide valuable choices and information to a consumer is apparent. Indeed, success in today's increasingly competitive world of e-commerce and Internet portal sites, for example, is often proportional to how efficiently and quickly implemented the most current and useful services are provided to consumers. Moreover, to attract loyal users of a Web site, for example, it is necessary to provide high-quality services, fast response times, and an overall rich and satisfying user experience. Not only is summary information about the relevant market valuable to a consumer from the perspective of making an informed choice, but offering additional similar items of inventory gives the consumer a chance to purchase inventory that may not have been desired until presented. It may be, for example, that significantly less expensive inventory is available by relaxing a consumer specified search criterion. This addition of results from a database of inventory recently known to have been available enhances the experience for the consumer because there is a greater chance that inventory will match the consumer's preferences. It may also be the case that the search criteria offered by a service requires the consumer to be more specific than the consumer wishes to be. Some services, for example, require the consumer to indicate return times to the nearest hour of the day, even though the consumer may be more flexible. In these cases, the consumer would have to perform many searches with differently specified return times of day before being satisfied that an overall result set addressed this flexibility. Thus, of further advantage in the present invention is that a consumer preference may be satisfied even though the preference is not specified, since a result that is not specified may be returned in the fare list from the fare server database as a result of relaxed searching.

Also, a consumer need not even be specific in accordance with the present invention. If, in the case of airline tickets, a consumer merely wants to enter a departure site and an approximate departure day, multiple popular destinations and market summaries therefor can be computed quickly and displayed to the consumer for added flexibility. For example, this might be ideal for a consumer wishing to vacation with little regard to destination. The particular place for vacation may matter less than the fact that tickets to a particular place are inexpensive for the travel time. Specifying only a departure location and an approximate departure date would be beneficial for such a situation. The consumer is thus given the option to be flexible, in cases where specificity places a burden on a consumer's choice.

A preferred implementation of the present invention provides a technique for displaying similar items of inventory and a market summary to a consumer in response to a request for available inventory. More preferably, the present invention relates to an Internet-based service, and more preferably still the present invention relates to an Internet-based travel agency. In a typical Internet-based travel agency, a consumer, using a computer connected to the travel service via the Internet, can purchase items from a dynamically changing inventory including airline tickets, rental car services and hotel rooms. By providing an additional fare server database for the storage of inventory recently known to have been available, in response to a consumer request for inventory, a market summary for similar items of inventory can be presented. The consumer can also opt to purchase an item from a list of similar inventory on which the market summary is based. The consumer can also view multiple market summaries for a range of inventory.

The present invention addresses the shortcomings of the prior art in several ways. In prior art systems that perform a single query, a consumer must be satisfied that a single set of results will return desirable inventory. If, however, only one query to an inventory database is performed, then the consumer is disadvantaged because the consumer does not have sufficient information about the market conditions surrounding the requested inventory in order to make an informed decision about a purchase. Also, there may be inventory approximating the consumer request that may be almost as or equally desirable to the consumer. The single query will not return this inventory in a result set because this inventory will be passed over as not matching the request. Gauging the relative bargain of offered inventory is therefore a difficult task.

The consumer could perform similar queries with the same or alternate services in order to gain a sense of the relevant market conditions, but nevertheless, this would be a time consuming process due to the demand placed on an inventory database and the consumption of time and effort due to the entering of multiple queries from a keyboard or other input device. This result is exacerbated when the search itself is performed by a third party not controlled by the issuer of the query.

A service could offer a glimpse of the market by showing a single alternate fare since offering a single additional item of inventory would place a minimal burden on time and computing power of the service. A single additional fare, however, does not address the overall need to understand the market conditions surrounding a requested item of inventory and does not offer the added flexibility gained from offering a gamut of similar fares and information derived therefrom to the consumer.

Also, the profits from some Internet-based services can be relatively low. For example, in comparison to a traditional travel agency that receives a relatively large commission for booking reservations (e.g., 3-10% of the purchase price), an Internet-based travel service receives a relatively low flat rate (e.g., $10) for booking reservations. Therefore, it would be beneficial to provide a way for an Internet-based travel service to add value to the service it provides to the consumer, since this would permit the travel service to collect additional fees. The present invention provides such added value by offering additional choices that are similar to the consumer specified inventory and presenting a market summary containing information valuable to the consumer. Accordingly, the probability that a consumer will find and purchase desirable inventory increases. Also, the enhanced experience relative to competitor services may secure additional and repeat customers that may not otherwise have used the service.

The present invention will now be explained in greater detail with reference to presently preferred embodiments thereof. First, a description of exemplary computer and network environments is provided. Then, a detailed description of the provision of additional fares and market summaries in accordance with the present invention is explained. Then, the present invention is described in detail in the context of an Internet-based travel service and an exemplary user interface. Lastly, an exemplary fare server database in accordance with the present invention is described.

Computer Environment

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port, game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2A:
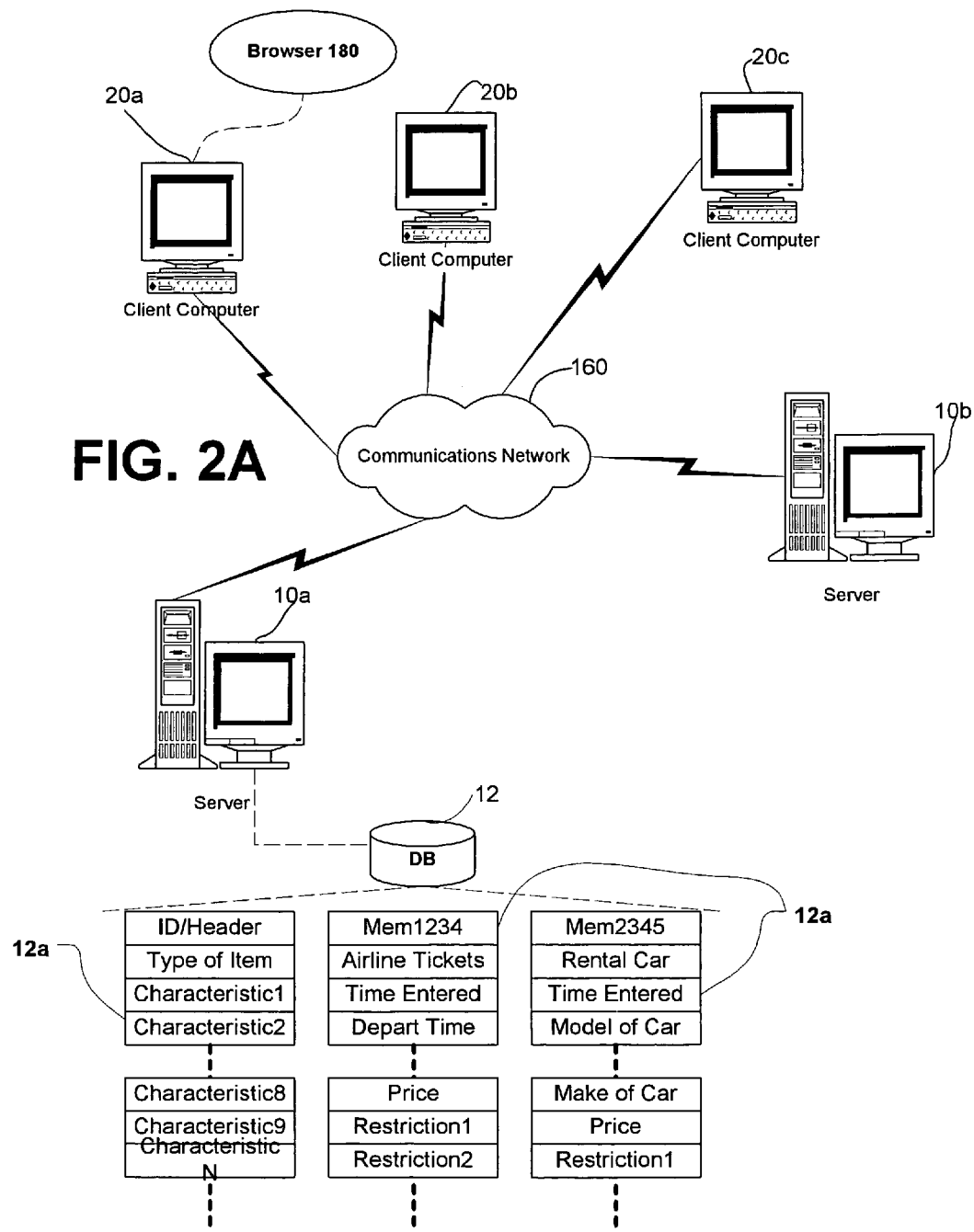
FIG. 2A is a block diagram representing an exemplary network environment with a server communicating with a database in accordance with the present invention.

As noted, the computer described above can be deployed as part of a computer network. In general, the above description applies to both server computers and client computers deployed in a network environment. FIG. 2A illustrates an exemplary network environment, with a server in communication with a database, in which the present invention may be employed. As shown in FIG. 2A, a number of servers 10a, 10b, etc., are interconnected via a communications network 160 (which may be a LAN, WAN, intranet or the Internet) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10. As shown, server 10a includes or is coupled to an inventory database 12.

As shown, the database 12 includes database fields 12a, which contain information about items of stored inventory. Multiple databases could also be shown since a server can communicate with multiple databases and is not limited to a single source of inventory. Ideally, a service would have access to many sources of inventory to be as complete as possible. For practical reasons, though, generally a server will have access to a single or limited number of inventory databases.

The database fields 12a can be structured in the database in a variety of ways. The fields 12a could be structured using linked lists, multi-dimensional data arrays, hash tables, or the like. This is generally a design choice based on ease of implementation, amount of free memory, the characteristics of the data to be stored, whether the database will be written to frequently or used predominantly to be read from, and the like. A generic inventory field 12a is depicted on the left side.

As shown, a field generally has sub-fields that contain various types of information associated with the field, such as an ID or header sub-field, type of item sub-field, sub-fields containing characteristics, and so on. Some general examples of fields 12a are also shown in the middle and on the right side. A general example of an airline ticket field is shown in the middle. This field 12a has a header "Mem1234" which can communicate the location of the field and sub-fields to the server 10a. The sub-fields contain various characteristics concerning the airline tickets inventory such as destination, departure time, price, restrictions, and the like. A general example of a rental car field is shown on the right side. This field 12a contains a header "Mem2345" which can communicate the location of the field and sub-fields to the server 10a. The sub-fields contain various characteristics concerning the rental car inventory such as car class, model, make, price, restrictions, and the like. These database fields 12a are shown for illustrative purposes only, and as mentioned before, the particular implementation of data storage in a database can vary widely.

Figure 2B:
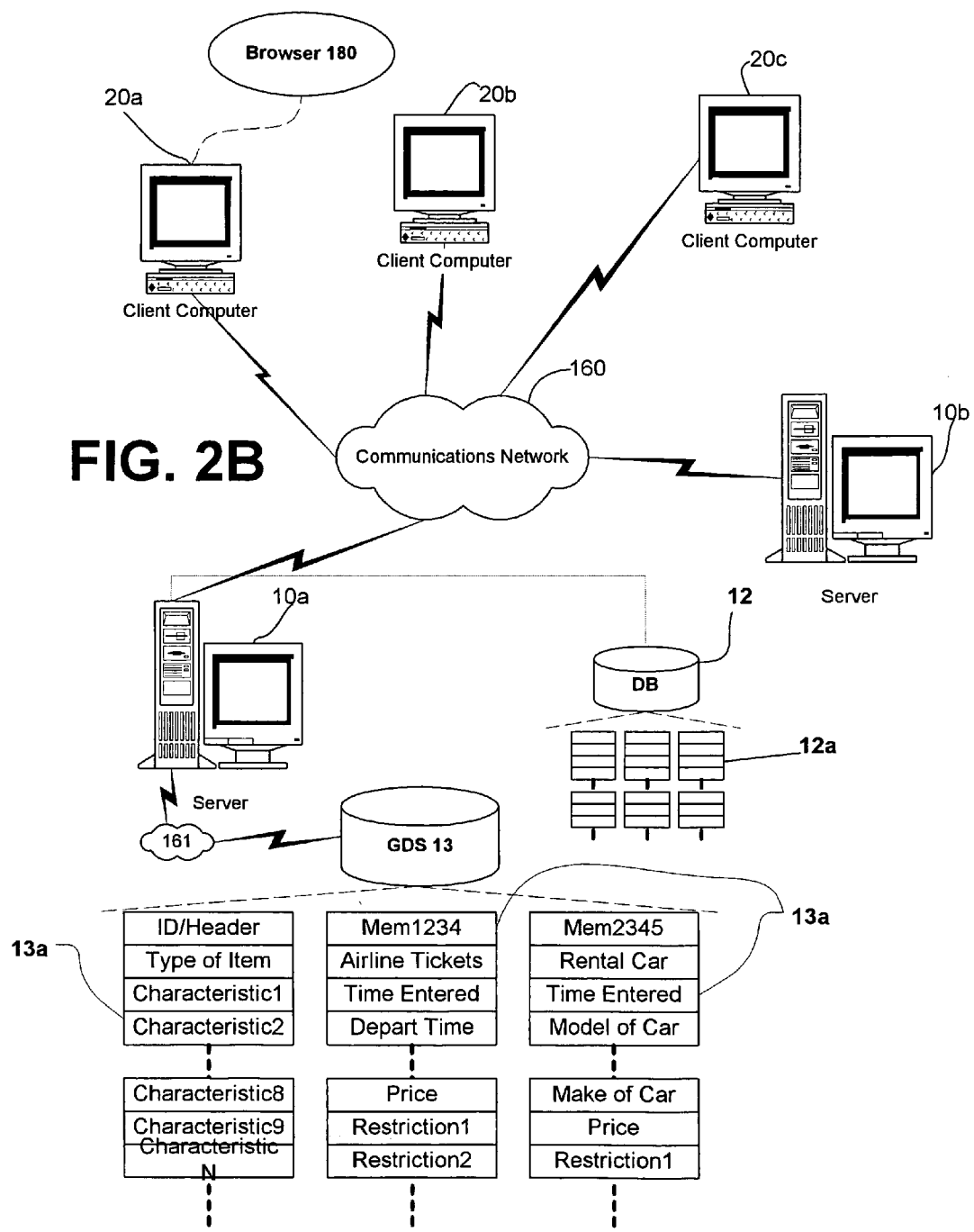
FIG. 2B is a block diagram representing an exemplary network environment with a server communicating with both a global distribution system and another database in accordance with the present invention.

FIG. 2B illustrates another exemplary network environment in which the present invention may be employed. In this environment, server 10a is connected to a global distribution system (GDS) 13 storing fields 13a via a separate communication interface 161 and is also connected to a database 12 having fields 12a. The server 10a could also communicate with GDS 13 through communications network 160. As described before, a GDS is a system/service that communicates with travel agents for the purpose of providing up to date fare, schedule and availability information in response to a query. As with other databases, a GDS also stores fields 13a containing information regarding available inventory. This environment is depicted to show that the present invention is not limited to a server or service with access to only one kind of database 12, and is not limited to a system communicating only with a GDS 13. The number of sources for inventory from which a service draws from is not crucial to the present invention, and the present invention can apply to a service connected to any number of inventory sources.

Thus, the present invention can be utilized in a computer network environment having client computers for accessing and interacting with the network and a server computer for interacting with client computers and communicating with a database or multiple databases with stored inventory fields. However, the inventory pricing process of the present invention can be implemented with a variety of network-based architectures, and thus should not be limited to the examples shown. The present invention will now be described in more detail with reference to a presently preferred implementation.

Market Summary Information and Similar Inventory from a Fare Server Database

In a preferred setting, the present invention pertains to an Internet-based service having access to a searchable database containing dynamic inventory. The service can perform a search of inventory based on a consumer request to return a result set satisfying the request. In addition, a fare server database is also provided which contains inventory recently known to have been available (e.g., within the last 48 hours). Based on the consumer request with at least one consumer request criterion relaxed, searches are performed in the fare server database for inventory similar to the requested inventory. Based on these additional items of similar inventory returned from the fare server database, a market summary is prepared and displayed to show the consumer a range of market conditions concerning inventory related to the requested inventory. In addition, the consumer can opt to purchase the inventory returned from the fare server database, which formed the basis for the market summary. However, the service need not be limited to an Internet-based service or a travel service. It could also be effected with a phone service, a facsimile service or any system with the ability to make offers, perform searches of a database and receive acceptances in real-time (i.e., interactively).

Figure 3A:
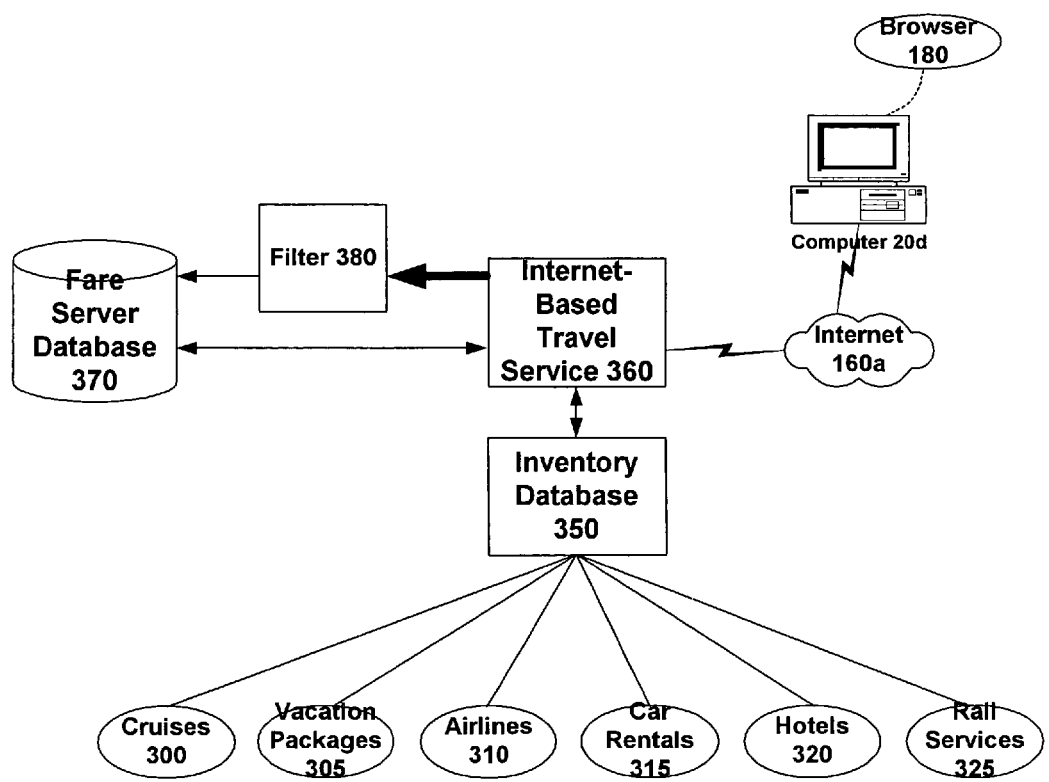
FIG. 3A is a block diagram of an Internet-based travel service in accordance with the present invention.

With reference to FIG. 3A, an Internet-based travel service that can employ the present invention includes suppliers 300, 305, 310, 315, 320, and 325 that provide information regarding fares, schedules and availability to inventory database 350 for storage. The inventory database 350 can be local to the Internet server for fast, efficient and flexible access, and inventory database 350 can also be external to the server requiring an external query. In either event, the pool of inventory is stored in inventory database 350. Thus, a searchable inventory database 350 is provided with up to date fare, scheduling and availability information.

Thus, when a consumer makes a request to the Internet-based travel service 360, having connected to the Internet-based service from a computer 20d with a browser 180 via Internet 160a, a search is performed in the inventory database 350 for inventory that meets the consumer's search request. A result set is returned that matches the consumer's search criteria. From among the returned result set, the consumer can then choose an item of inventory.

In addition to the inventory database 350 with up to date inventory information, in accordance with the present invention, a fare server database 370 is provided which contains recent inventory information. Since a search for up to date inventory in the inventory database 350 can be costly in terms of time and computing power, a search through a local fare server database 370 which contains inventory recently known to be available can save much time. In most cases, the items of inventory contained in the fare server database 370 will still be available. In any event, if a consumer wishes to purchase an item of inventory contained in the fare server database 370, a search can then be performed in inventory database 350 to ensure that it is still available.

As mentioned, fare server database 370 contains inventory recently known to have been available. To be more specific, any time a consumer makes an inventory request to the inventory database 350, a result set is returned. Whether or not the inventory in the result set is purchased, all of the inventory returned is inventory recently known to have been available, except for an item that has been purchased. Before inventory is stored in fare server database 370, however, some inventory is filtered from the result set by filter 380. As mentioned, any inventory actually purchased is filtered out and not included in fare server database 370. In addition, certain items of inventory, which tend to be low profile or low volume items of inventory, are also filtered out and not included in the fare server database 370. In the case of an airline fare server database, for example, items such as one way and multiple destination itineraries, children, senior fares, infant, and infant without seat fares, first and business class itineraries, and itineraries with more than four flight segments are filtered out. Thus, in this case, only roundtrip, adult, coach class tickets with four or less flight segments would populate the fare server database 370.

In addition to filtering result sets returned from inventory database 350, items of inventory can be deleted from the database when knowledge regarding an item's availability is no longer recent. For example, if an item of inventory has been stored for more than 48 hours, it is no longer considered recently known to have been available and is deleted from the database. Also, if there are gaps in coverage in the fare server database 370, periodic queries can be made to the inventory database 350 for the purpose of filling the gaps. Periodic queries could also be made for popular or high volume items of inventory.

In addition to communicating with the Internet-based Travel Service 360, the fare server database 370 can communicate with other services as well. For example, another service that can be offered is an email service that will send a consumer periodic information about inventory in which the consumer is interested. To the extent that the fare server database 370 communicates with other client services, such as an email service, it is important that the inventory contained in the fare server database 370 is recent and complete enough to be useful to the client service. Thus, if there are gaps in the coverage of the fare server database 370, additional queries can be made to the inventory database 350 based on the particular needs of the client service for the purpose of keeping the fare server database 370 current.

FIG. 3B depicts an Internet-based travel service that queries a global distribution system and another database. The difference from FIG. 3A is that inventory database 350 is shown as the collection of multiple sources for up to date inventory information, including a global distribution system 13. In this case, queries are made to two different sources for results matching the query. Information from suppliers 300, 305, 310, 315, 320, and 325 are supplied separately to global distribution system 13 and to another database 12. Anytime a query is made by the Internet-based travel service 360, a query is sent to global distribution system 13 and to database 12. If the respective inventories of the global distribution system and the database 12 are different, which is a possibility, different result sets will be returned from the respective queries. There may also be some overlap. After combining the two result sets and eliminating redundancies in the combined result set, the combined result set can be considered a single result coming from an inventory database 350. Thus, for purposes of the present invention, multiple sources of up to date inventory information can be treated as coming from a single source, inventory database 350, different from fare server database 370.

A global distribution system 13 is external to the server having the Internet-based travel service 360. Since a global distribution system 13 is typically operated by a third party, the searching technique is generally unknown and cumbersome. In other words, although results returned in response to a query match the characteristics specified in the query, exactly how the GDS arrives at the result set returned, and the completeness thereof, are unknown to the Internet-based travel service. GDS 13 queries are limited for at least three reasons. First, since the global distribution system 13 is external to the server, implemented and run by a third party, the search technique is unknown at the server side. Second, since the communication lines between the server and the global distribution system 13 are of limited data transfer rate and limited bandwidth, only a finite amount of demand can be handled by the communication system. This factor comes into play particularly at high peak traffic times when many different services make demands on the global distribution system 13. Third, since searching consumes time and computing power, a global distribution system 13 can not perform a search for every permutation and combination of items which satisfy a query. This is particularly true for items such as airline tickets, for which there are incalculable ways of satisfying a query. Nonetheless, the present invention can be employed independently of control of the source of up to date inventory. Thus, the present invention can be employed with such a global distribution service 13 even though there is little control over the search performed by a global distribution service 13. As the above demonstrates, the benefits of the present invention are clearly observable in the case of a GDS 13 because the searches performed locally in the fare server database 370 achieve economy savings in terms of time relative to a GDS 13 query search. The local searches of the fare server database 370 also are the basis for valuable market summary information displayed to the consumer.

An Internet-based travel service 360 comprises a Web site or other computer-based means for displaying to the consumer request criteria, price offers, and purchased inventory details. Internet-based travel service 360 further comprises means for gathering information concerning method of payment, delivery details, and the like. Although a preferred embodiment is described with respect to an Internet-based inventory purchase, the present invention can be employed in any system with a searchable database capable of interacting with and offering inventory to a consumer.

Figure 4:
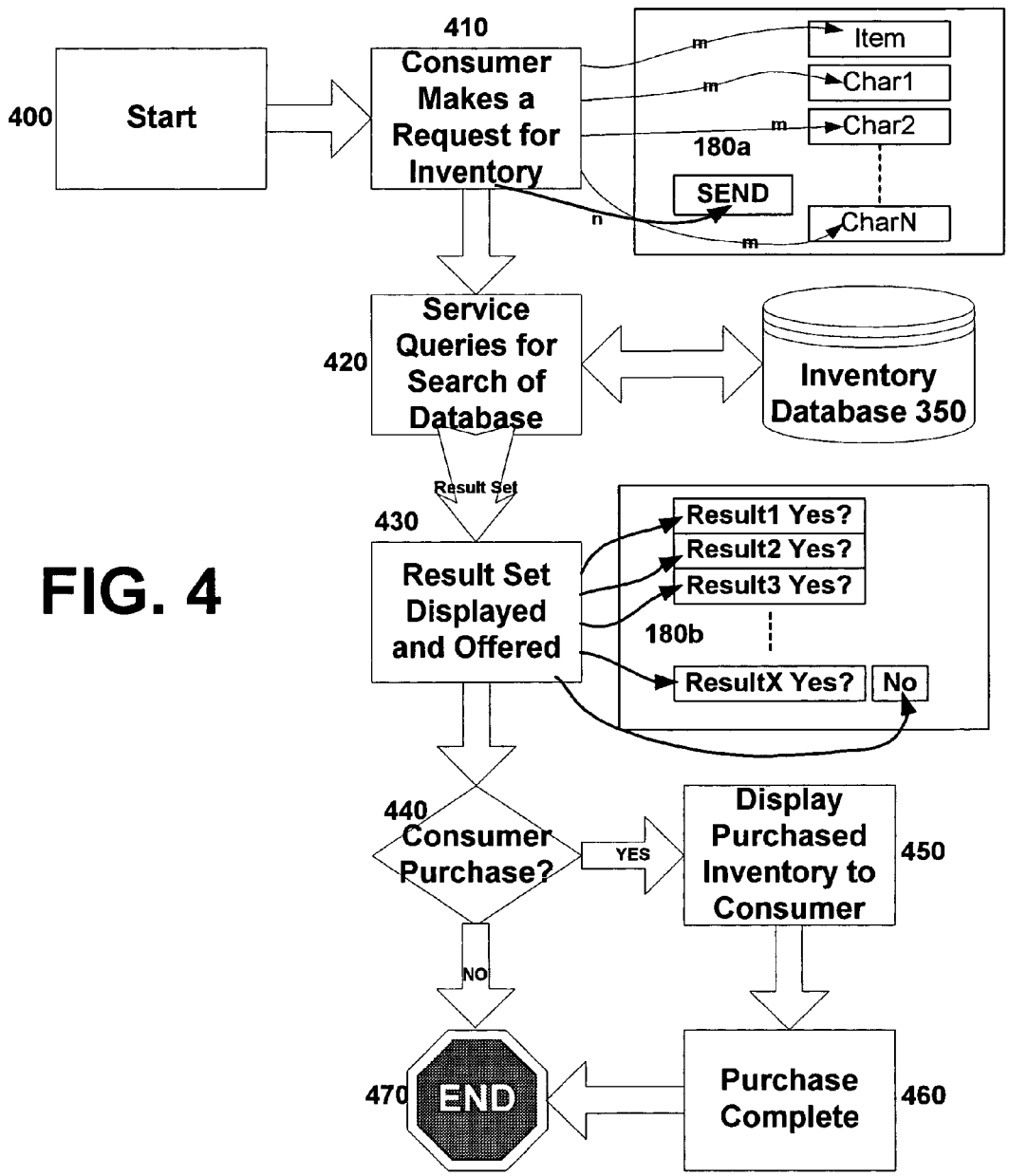
FIG. 4 is a flow chart of a typical method of pricing inventory from a searchable database.

FIG. 4 is a flow chart showing a typical course of pricing inventory from a searchable database. After start 400, a consumer makes a request for inventory by specifying characteristics of inventory for possible purchase at 410. In the case of an Internet Web site, a consumer enters data into the window of a browser window 180a. The data entered serves to specify the item for pricing. For example, a consumer enters data from a computer input device into portions of the browser window 180a concerning the item to be priced and N characteristics that describe the item. Arrows m represent portions of browser window 180a where a consumer can enter such data. After the data is input, a consumer can "click" on the send button. Clicking is a term of art that describes the use of a mouse input to position a mouse pointer over a designated area. Once the mouse pointer is over the area, the mouse button is pressed. Other input means can also be used to activate the send function. Arrow n shows the send button of browser window 180a. By clicking the send button, the consumer initiates the process of querying a database 350 for matching inventory.

It should also be understood, however, that when a consumer enters information via an input device which will specify an item to be priced, an omission can also specify an item to be priced. For example, often times there is no requirement that the user specify the supplier of an item to be priced. Although a user may specify a supplier, in the case that the user does not, the fact that a supplier is not specified may still be considered a characteristic of the item to be priced by the service. In other words, when the service searches a database for an item having consumer specified characteristics, the service will not restrict the search on the supplier if a consumer has not specified a supplier. Nonetheless, this is still a characteristic of the item to be priced; the characteristic is that no restriction will be placed on the supplier.

At 420, the service queries the database 350, which can also be a global distribution system 13, or a combination of sources for inventory. The database 350 is searched, and a set of results is returned that matches the query. By matching it should be understood that the result fits the scope of the characteristics. For example, if the characteristic in the case of airline tickets is that the flight leaves between 10:00 a.m. and 5:00 p.m., a flight leaving at 2:00 p.m. matches that characteristic because it is within the scope of the characteristic. The result set is then displayed to the consumer at 430, for example, in a browser window 180b. In browser window 180b, results 1 through X are displayed each having an option to purchase. If a consumer wishes to purchase any of the results at 440, the consumer can click on that portion of the browser window 180b indicating the offer to purchase. As shown, to purchase the first result, a consumer would click on or otherwise input portion "Result1 Yes?". If the consumer makes a purchase, the details concerning the purchase are displayed to the consumer at 450, and after purchase details, such as payment method and delivery details, are agreed upon, the purchase is complete at 460 and the flow comes to an end at 470. If the consumer does not wish to purchase any results, the consumer clicks on or otherwise inputs the "No" portion of browser window 180b, and the flow comes to an end at 470.

Figure 5A:
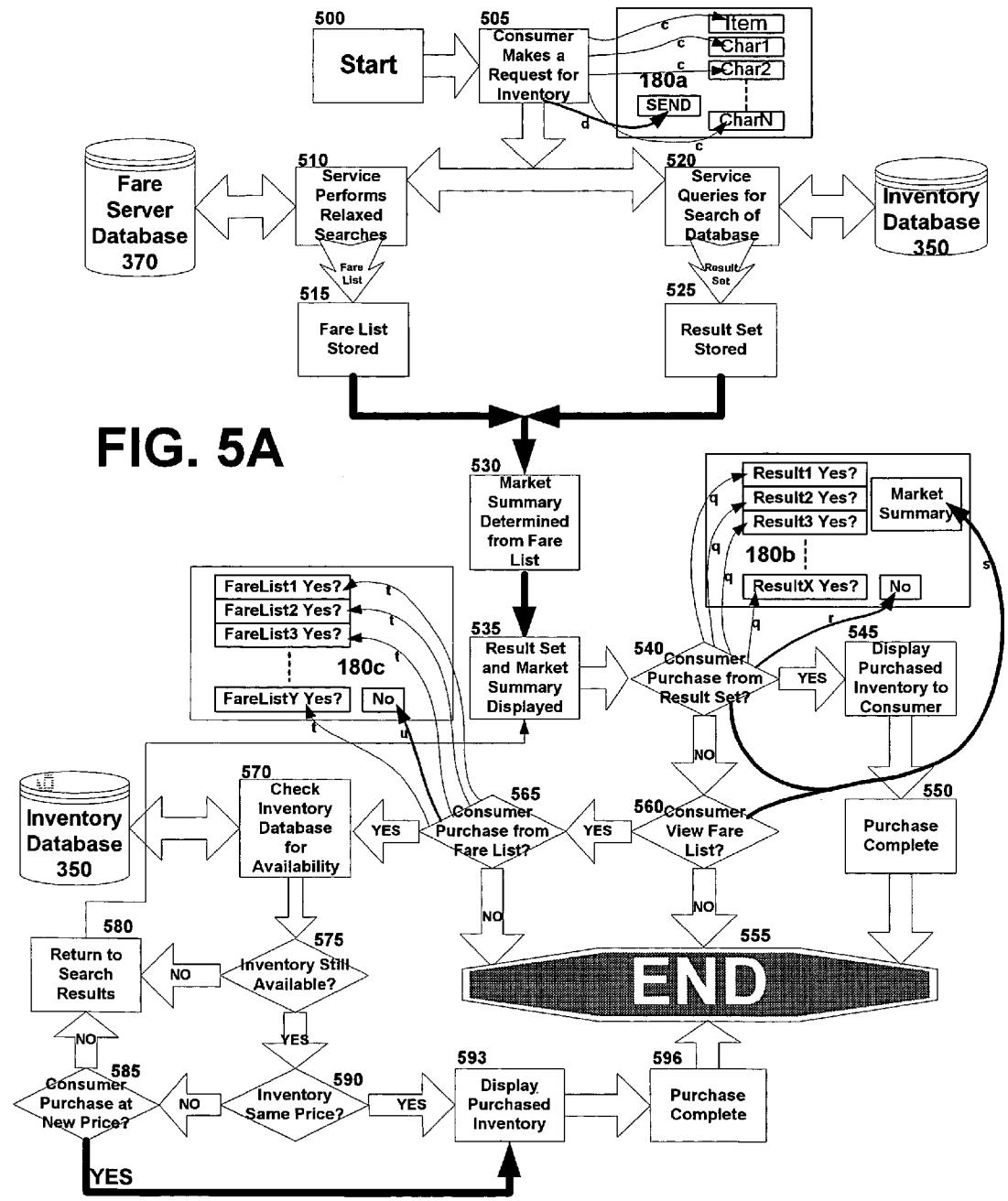
FIG. 5A is a flow chart of a course for pricing inventory in accordance with the present invention.

FIG. 5A is a flow chart of a computer-based method for pricing dynamic inventory that supplements a pricing experience by displaying a market summary for inventory similar to consumer specified inventory, and by giving the consumer the option to purchase the similar inventory. After start 500, a consumer makes a request for inventory by specifying characteristics of inventory for possible purchase at 505. In the case of an Internet Web site, a consumer enters data into the window of a browser window 180a. The data entered serves to specify the item for purchase. For example, a consumer enters data from a computer input device such as a mouse into portions of the browser window 180a concerning the item to be purchased and N characteristics that describe the item for possible purchase. Arrows c represent portions of browser window 180a where a consumer can enter such data. After the data is input, a consumer can "click" on the send button. Other input means can also be used to activate the send function. Arrow d shows the send button of browser window 180a. By clicking the send button, the consumer initiates the process of querying a database 350 for matching inventory and a fare server database 370 for similar inventory.

At 520, the service queries the database 350, which can also be a global distribution system 13, or a combination of sources for inventory. The database 350 is searched, and a set of results is returned that matches the query. In the figure, in browser window 180b, X results are shown returned that represent the matches to the query in X fields: Result1, Result2, Result3, . . . ResultX. This result set is temporarily stored at 525.

At 510, the service performs relaxed searches of the fare server database 370, for retrieval of a fare list from fare server database 370. The information relating to inventory retrieved from the fare server database 370 is being referred to as a fare list and the information relating to inventory retrieved from the inventory database 350 is being referred to as a result set, even though the terms could apply to either database. A relaxed search is a search where the search parameters are made less restrictive. For example, in FIG. 5A, a consumer has entered N characteristics for inventory. A relaxed search would be a search containing less than N of the consumer specified characteristics. Or, a particular characteristic could itself be relaxed. For example, in the case of an airline ticket purchase, if the second characteristic specified by the consumer, Char2, is that the flight should leave at 5:00 p.m., a relaxed search would alter that characteristic to encompass flights leaving between noon and midnight. In effect, a relaxed search broadens the scope of possible inventory that can be returned as a result of a search. Although at least one relaxed search is performed to retrieve a fare list from the fare server database 370, some characteristics specified by the consumer must still be used in the relaxed search. For example, in the case of an airline ticket purchase, the place of origin of the flight specified by the consumer will generally be used as a part of the metes and bounds of the relaxed searches performed. The retrieved fare list based upon at least one relaxed search is then stored at 515. Although the searches of the fare server database 370 and the inventory database 350 are depicted as being performed in parallel, these searches could also be performed sequentially.

Also, in a preferred embodiment, a prescribed algorithm is used to determine how to relax the consumer query. Although searches for the same type of inventory are relaxed by the same prescribed algorithm, the factors used to relax a consumer query are dependent on the type of inventory search. For example, in the case of airline tickets, factors which could be relaxed are the length of stay, supplier, number of segments, and the like. In addition, different factors can be relaxed for different searches in accordance with the prescribed algorithm so as to return a broad cross-section of inventory recently known to have been available to the consumer for possible purchase. The combined results of these relaxed searches is what is being referred to herein as the fare list. In another preferred embodiment, the consumer can choose which of several factors to relax, for retrieval of similar inventory from fare server database 370.

Next, at 530, a market summary is determined from the fare list. The fare list contains items of inventory that are similar to the inventory specified by the consumer. Thus, for example, an average of the prices of the similar inventory, or the lowest price and highest price contained in the fare list, could all be relevant information to the consumer as conveying information about the relevant market. Although in a preferred embodiment, the market summary consists of pricing information including at least one of the lowest price, the highest price and average price of similar inventory, as reflected by the fare list retrieved from the fare server database 370, additional characteristics of the inventory in the fare list could also be relevant and thus displayed. For example, in the case of the purchase of airline tickets, a market summary could include the extent to which other similar items of inventory are direct flights or not. For example, if the result set returned from the inventory database 350 contained only items of inventory that had multiple segments, or stopovers, it may be useful to display to the consumer that similar items of inventory have direct flights available. Thus, although pricing is a particularly pertinent measure of the market in which items of inventory are being sought for purchase, it is not the only relevant item of information that could be presented to the consumer in the form of a market summary.

Once a market summary is formed, the result is displayed to the consumer at 535, for example, in a browser window 180b. In browser window 180b, results 1 through X, from the result set returned from the inventory database 350, are displayed each having an option to purchase. The market summary is also displayed so that the consumer can have input about how the displayed inventory fits within the universe of similar inventory. Fares with special features relative to the market summary can also be identified as such. In a preferred embodiment, fares that fall below a certain percentage of the average fare are flagged as such by placing a star adjacent to the fare. In another preferred embodiment, fares within a certain percent, e.g. 15%, from the lowest fare are indicated as such, for example, by placing a star adjacent to the result. Or, a certain percentage of fares that are the lowest priced can be displayed with a special mark. If a consumer wishes to purchase any of the results at 540, the consumer can "click" on or otherwise input that portion of the browser window 180b indicating the offer to purchase. As shown, to purchase the first result, a consumer would click on or otherwise input portion "Result1 Yes?". If the consumer makes a purchase, the details concerning the purchase are displayed to the consumer at 545, and after purchase details, such as payment method and delivery details, are agreed upon, the purchase is complete at 550 and the flow comes to an end at 555.

If the consumer does not wish to purchase any results, or the consumer clicks on or otherwise inputs the "No" portion of browser window 180b, the consumer has the option to purchase inventory similar to the inventory requested, as reflected by the fare list. If the consumer clicks on the "No" portion at 545, the flow could also come directly to an end 555. In FIG. 5A, the consumer is still given the option to view similar inventory as reflected by the fare list. Either way, if the consumer clicks on the market summary at 560, shown by arrow s, the consumer is given the option to purchase from the fare list at 565. If the consumer does not wish to view the fare list, the flow ends at 555.

At 565, the consumer is shown the results from the fare list, which represent items of inventory similar to the inventory requested at 505. Y results are shown in the fare list as shown by arrows t. Each of the items in the fare list has an option to purchase by clicking on the portions designated by arrows t, or otherwise making an input into the computer. If the consumer does not wish to purchase from the fare list either, the flow comes to an end at 555 when the consumer clicks on or otherwise inputs the "No" portion of browser window 180c designated by arrow u.

If the consumer does wish to purchase any one of the Y items of inventory from the fare list, inventory database 350 must still be queried to determine availability for the item, since the item of inventory is recently known to have been available. There is a relatively high likelihood that the item of inventory will still be available, but a check must still be made at 570. Thus, inventory database 350 is queried for the exact item requested from the fare list. If the inventory is no longer available, the flow returns to the original result set at 580. This returns the flow to 535. There are additional routes that could be taken, however. For example, instead of returning to the search results at 535, the flow could return to 565, and the consumer could have the option of purchasing from the fare list again. In this case, the no longer available item of inventory chosen previously could be removed from the display. Alternatively, an entirely separate offer could be made to the consumer that is known to be available, based on the results of the inventory check at 570. Further, if the inventory is no longer available, the flow could come to an end at 555.

If the inventory is still available, the price may have changed. Thus, at 590, if the price is no longer the same price as the price offered in the fare list, the consumer is given the option to purchase at the new price at 585. If the consumer wishes to purchase at the new price, then the purchased inventory is displayed to the consumer at 593, and after purchasing details are accounted for, the purchase is complete at 596 and the flow ends at 555. If the consumer does not wish to purchase the item of inventory at the new price, then a situation is presented similar to the situation where the inventory was no longer available. The flow returns to the result set and market summary of 535 at 580. As mentioned previously, instead the flow could go to 565 with the newly priced item removed from the fare list, to a separate offer based on the results returned at 570, or the flow could come to an end at 555. If the inventory from the fare list is still available and the price has not changed, then the purchased inventory is displayed to the consumer at 593. After purchasing details have been gathered, the purchase is complete at 596 and the flow ends at 555.

FIG. 5B is a flow chart of a computer-based method for pricing dynamic inventory that enhances a pricing experience by displaying a market summary for similar types of inventory, and by giving the consumer the option to purchase similar inventory without requiring specificity from the consumer. In other words, the consumer can skip an initial search of inventory database 350 and make a fare compare query without the specificity required of a query of inventory database 350. After start 501, a consumer makes a request for inventory by specifying characteristics of inventory for possible purchase at 506, without having to be as specific as the request made at 505 in FIG. 5A. In the case of an Internet Web site, a consumer enters data into the window of a browser window 180d. The M characteristics entered serve to specify the item for purchase. M will generally be a number of characteristics that is less than the N characteristics from FIG. 5A, although this is not strictly necessary. In the case of airline tickets, the user could enter the origin, the destination and the approximate departure date to fulfill a fare compare query. An even more flexible fare compare query could have the consumer leave the destination blank, allowing the service to fill in the destination multiply and provide market summaries for a variety of popular destinations. Arrows e represent portions of browser window 180d where a consumer can enter such data. After the data is input, a consumer can "click" on the send button. Other input means can also be used to activate the send function. Arrow f shows the send button of browser window 180d. By clicking the send button, the consumer initiates the process of querying a fare server database 370 for inventory.

At 511, the service determines whether a flexible fare compare is being requested. In the case of airline tickets, for example, a flexible fare compare query could leave the destination blank, and an ordinary fare compare could include the destination. It should be understood that a flexible fare compare is flexible relative to the ordinary fare compare, i.e., the ordinary fare compare is also flexible compared to the specificity required of a search of inventory database 350. The flexible fare compare, e.g., may only require M-1 characteristics to be entered by the consumer at 506. In any event, it is clear that there is a range of flexibility that can be achieved in accordance with the present invention.

If an ordinary fare compare is requested, then the service performs a fare compare search at 541. In the case of the airline tickets example to which reference has been made, the consumer has entered the origin, destination and approximate departure date. The fare server database 370 is searched for items of inventory matching the consumer specified information. In a preferred embodiment, all inventory matching the consumer specified information is returned as a fare list. In another preferred embodiment, items of inventory are returned by a prescribed algorithm which may or may not return all inventory contained in the fare server 370 matching the consumer specified information. In FIG. 5B, P items of inventory are returned in the fare list in P fields: FareList1, FareList2, FareList3, . . . FareListP. The result of the fare compare query to the database is returned as a fare list, which is stored at 546.

At 551, a market summary is determined from the fare list. As stated previously, the market summary can comprise at least one of the lowest price, the highest price, average price of the items of inventory in the fare list, and any additional characteristics of the inventory in the fare list that also may be relevant to the consumer. At 556, the market summary and the fare list are displayed to the consumer in browser window 180e. The items of inventory in the fare list each having an option to purchase are shown by arrows g. The market summary information portion is shown by arrow h and gives the consumer a chance to see how the inventory in the fare list compares to the overall market of inventory recently known to have been available.

At 561, a consumer can purchase an item of inventory from the fare list by clicking on or otherwise inputting one of the items of inventory shown in browser window 180e. If the consumer does not wish to purchase inventory from the fare list, the consumer clicks on or otherwise inputs the "No" portion of browser window 180e shown by arrow I, and the flow comes to an end at 566. If the consumer does wish to purchase an item of inventory from the fare list, availability must be checked to ensure that the inventory is currently available.

At 571, the inventory database 350 is queried. There is a relatively high likelihood that the item of inventory will still be available, but a check must still be made. Thus, inventory database 350 is queried for a match of the exact item requested from the fare list. At 576, a determination is made as to whether the selected item of inventory from the fare list is still available. If the inventory is no longer available, the flow returns to the display of the fare list and market summary at 556. In this case, the no longer available item of inventory chosen previously could be removed from the display. There are additional routes that could be taken, however. Alternatively, an entirely separate offer could be made to the consumer that is known to be available, based on the results of the inventory check at 571. Further, if the inventory is no longer available, the flow could come to an end at 566.

If the inventory is still available, the price may have changed. Thus, at 581, if the price is no longer the same price as the price offered in the fare list, the consumer is given the option to purchase at the new price at 586. If the consumer wishes to purchase at the new price, then the purchased inventory is displayed to the consumer at 591, and after purchasing details are accounted for, the purchase is complete at 594 and the flow ends at 597. If the consumer does not wish to purchase the item of inventory at the new price, then a situation is presented similar to the situation where the inventory was no longer available. The flow returns to the fare list and market summary display of 556. As mentioned previously, instead the flow could go to a separate offer based on the results returned at 571, or the flow could come to an end at 597. If the inventory from the fare list is still available and the price has not changed, then the purchased inventory is displayed to the consumer at 591. After purchasing details have been gathered, the purchase is complete at 594 and the flow ends at 597.

If, on the other hand, a flexible fare compare is performed, the flow goes from 511 to 516. In the case of airline tickets, a flexible fare compare might require only an origin and an approximate time of travel. At 516, the service performs multiple fare compare searches, for multiple destinations. In a preferred embodiment, a consumer can have searches done for any popular destination. These destinations can be formulated by a prescribed algorithm and can also be subject to change as destinations fall out of favor. The list of popular destinations can also change based on the origin entered by the consumer, and based on other factors. In another preferred embodiment, the consumer enters multiple destinations for search. Multiple fare lists are returned from the fare server database based on the flexible fare compare query, one for each type of good reflected by the relaxed characteristic. In the airline ticket example, a fare list is returned for each origin/destination pair. These fare lists are stored at 521. Market summaries are determined for each fare list at 526. As described, the market summary comprises pricing or other information including at least one of the lowest price, the highest price and average price of similar inventory, as reflected by a fare list. Additional characteristics of the inventory in the fare list could also be relevant and thus reflected in the market summary.

The market summaries are displayed to the consumer at 531. In FIG. 5B, the displayed market summaries are shown in browser window 180f by arrows j. A consumer then has the option to choose a market summary for further review of the fare list reflected by the market summary. If a consumer does not wish to view any of the fare lists, the consumer can click on or otherwise input the "No" portion of browser window 180f shown by arrow k, and the flow ends at 597. If the consumer wishes to view the fare list from which a particular market summary was determined, a consumer can click on or otherwise input one of the market summary portions as designated by arrows j. In FIG. 5B, Z market summaries are shown displayed. In the airline ticket example, Z destinations have been searched in the fare server database 570.

If a consumer does choose a particular market summary at 536, the flow goes to 556 where the fare list and associated market summary are displayed to the consumer. The flow proceeds as described above from 556 once the fare list and market summary of the selected market summary are displayed. In another preferred embodiment, a possible change from FIG. 5B is that instead of a return to the fare list and market summary display of 556, the flow could return instead to 536 where the consumer could select another fare list and market summary for display at 556.

Although in a preferred embodiment, the similar inventory returned in the fare list from the fare server database is regarded as purchased after availability and same pricing is confirmed, an additional act of redisplaying the inventory to confirm that the consumer wishes to purchase the inventory can be performed. Additionally, purchase confirmations can be made at any time to ensure that the consumer wishes to make the purchase. Confirmations of any of the previously described acts can also be made at any point in the flow charts of FIG. 5A and FIG. 5B. Furthermore, purchasing details such as payment method, delivery methods and the like can be requested and received at any time during the flow.

In addition, it should be made abundantly clear that there are many different ways that a browser sequence such as the ones just described can be implemented. A different browser window can be used for each act, for example. A different browser instance could be created for some acts. Pop-up menus or windows could be used. Dynamic windows using applets, plug-ins, Xcontrols, java, javascript and the like could be implemented. Keyboard or other inputs could be used in place of a mouse input. In short, the number of different ways to implement Web pages or browser instances are countless, and thus the implementation described above is for illustrative purpose only.

An Internet-Based Travel Service and User Interface Example

With reference to FIG. 6 and FIGS. 7A through 7J, the operation of the present invention and a technique for displaying information about similar inventory is described with respect to an Internet-based travel service offering at least airline tickets. Online or offline travel agencies have not been able to provide the customer with an extensive report of low fares for similar but not strictly matching flights. This can be termed a "fuzzy dates" problem. Since the number of possible flight combinations is very large and expensive to compute, existing systems only search for flights restricted to the specific dates requested by customers and as close as possible to the specific times requested by customers. Often times there are significantly less expensive flights leaving later in the day, a day later, a week later, or on one of the many combinations of dates and times possible. Any change in the query could uncover a less expensive flight. Today a customer whose travel plans are flexible would need to perform tens, if not hundreds, of individual query requests to get a fairly complete picture of lowest priced flights over a span of days. By providing a "fare compare" feature, the present invention provides a market summary automatically and provides fast access to the fare list from which the market summary was determined.

Figure 6:
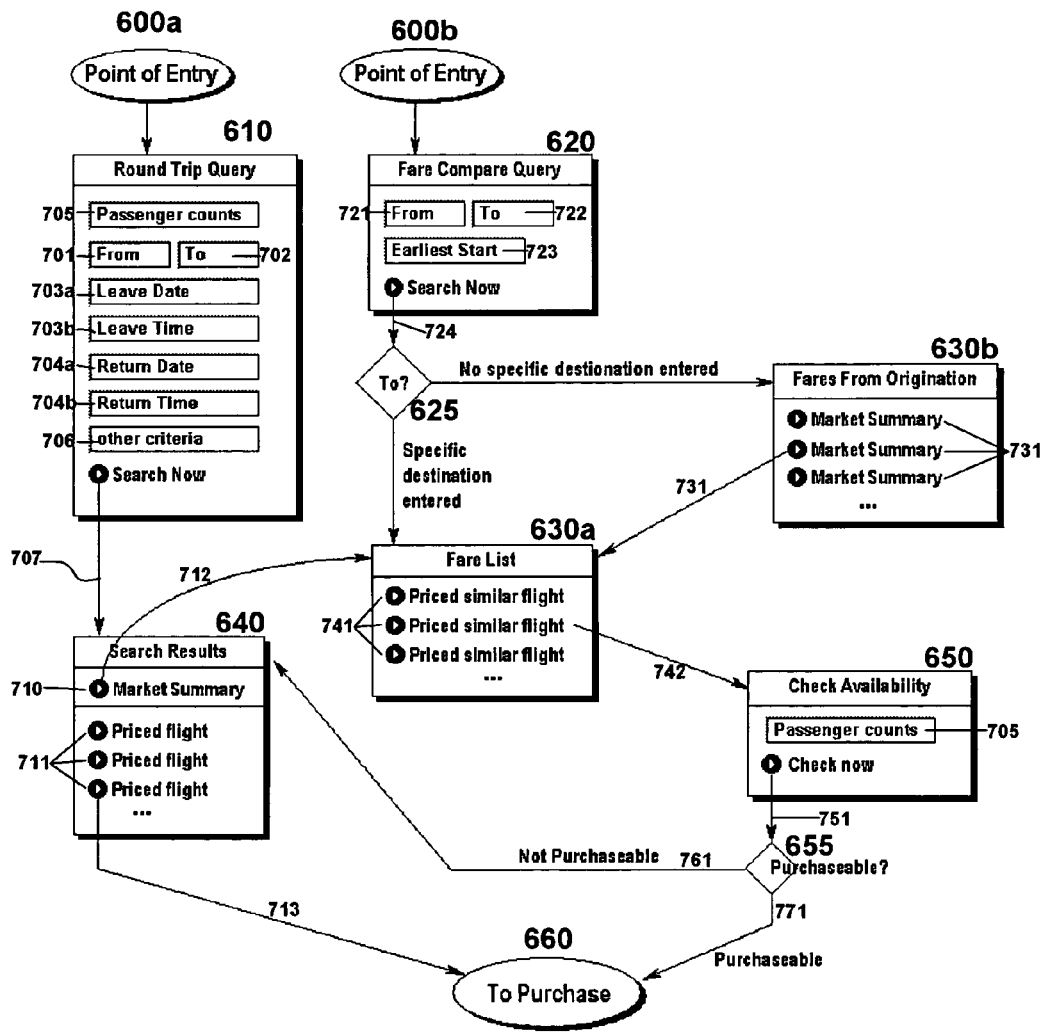
FIG. 6 is a flow chart of a course for pricing inventory from an Internet-based travel service in accordance with the present invention.

Thus, the present invention improves on the customer experience of shopping for purchasable products by providing price information based on similar but not identical queries. In the example of airline tickets, and in a first embodiment, it could work as follows. In FIG. 6, after point of entry 600a, a customer comes to a Web site and enters in passenger counts 705, origin 701, destination 702, leave date 703a, leave time of day 703b, return date 704a, return time of day 704b, and other criteria 706 in a browser page known as a round trip query page 610. An example of such a browser page is shown in FIG. 7A. In browser page 610, the customer enters origin 701, destination 702, leave date 703a, leave time of day 703b, return date 704a and return time of day 704b. The customer enters in passenger counts 705 in terms of adults 705a, seniors, 705b, children 705c, infants 705d, and whether infants need a reserved seat 705e. Other criteria 706 can be the class of ticket 706a, direct flight choice 706b, change penalty option 706c, no advanced restrictions choice 706d and choice of airline 706e. Preferences such as other criteria 706 are generally optional. A search is performed by clicking on or otherwise inputting search link 707. There is also a link or links 600b that can take a customer directly to the fare compare service.

The Internet-based travel service makes a determination of the lowest priced flights that can be offered to the customer if they are willing to be flexible on the query. The service then determines a market summary from these flights. For example, if the customer could leave a day earlier or return a day later, the customer might save money. This market summary is presented proximal to the search results contained in a search results page 640. The market summary can be presented in different ways: as a one low price, as two low prices (the lowest of the lows, and the highest of the lows), as three prices (low, average, high), or other statistical combinations. The market summary could also be a simple link (clickable or otherwise accessible link) to this type of information. As described previously, a market summary need not be restricted to pricing information.

The Internet-based travel service searches up to date inventory databases to find the lowest priced flight or flights that meet the customer's needs (known as the search results). These search results are always responsive to the dates and times requested, and are displayed to the customer in a search results page 640. In addition, the fare server database containing inventory recently known to have been available is searched for similar flights. A market summary 710 is determined on the basis of the search of the fare server database and is displayed on search results page 640. Search results page 640 also displays the search results by listing priced flights 711 in accordance with the customer's specified criteria. As indicated, the customer can optionally ask for more specificity in the search results by specifying other criteria 706 such as an airline or airlines, direct flights only, a specific class of ticket, or non-restricted or non-refundable tickets.

Figure 7B:
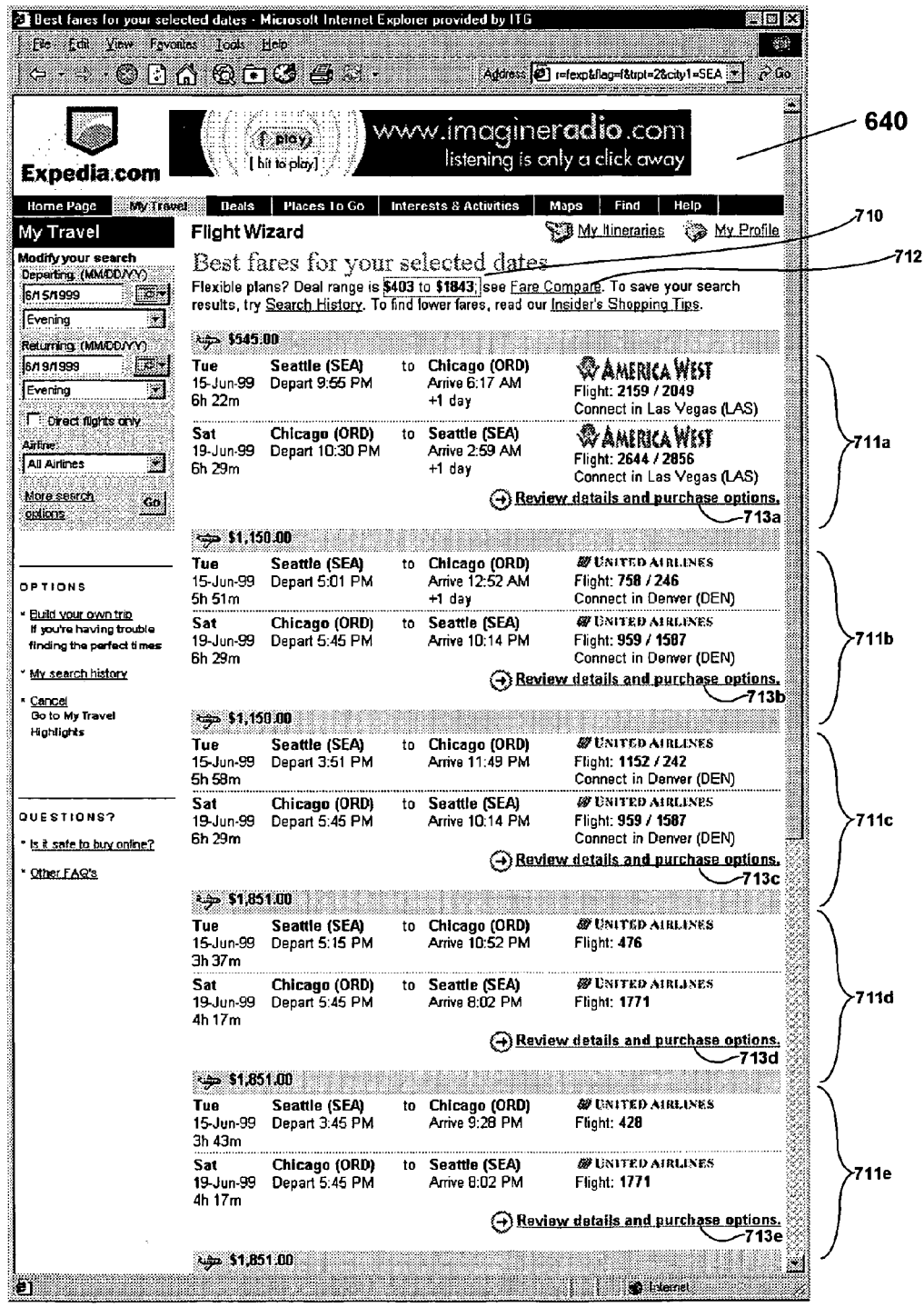
FIG. 7B is an example of a search results Web page and corresponding user interface in accordance with the present invention.

FIG. 7B shows an example of a search results page 640. Page 640 lists priced flights 711a, 711b, 711c, 711d and 711e each having a respective link 713a, 713b, 713c, 713d and 713e to review details and purchase options for the respective priced flight. Market summary 710 shows a range of prices for similar inventory conveying that a lowest price found was $403 and a highest price found was $1843. Other information could additionally be shown as part of the market summary 710. A link 712 is also provided for the customer to directly try the fare compare feature. If a customer enters a link 713, the purchasing page 660 is displayed and the customer can review details relating to the priced flight and is given the opportunity to purchase.

Figure 7C:
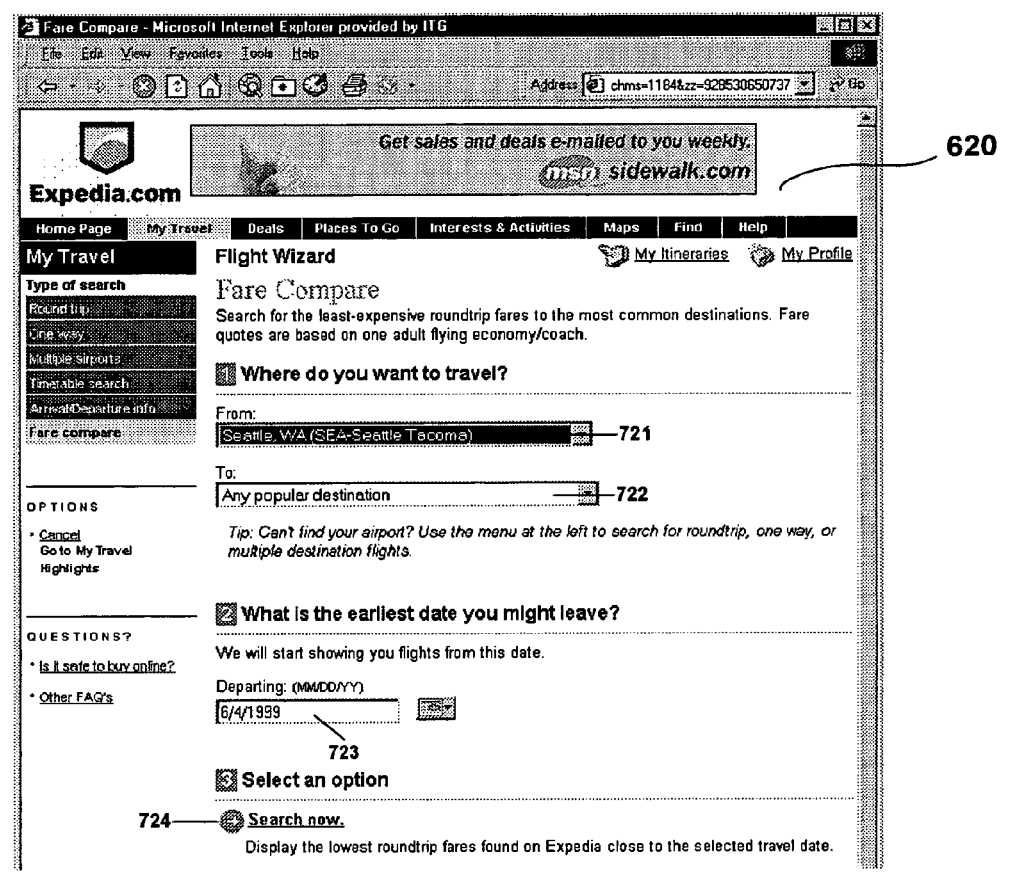

FIG. 7J is an example of a purchasing page 660. As can be readily appreciated, flight details are summarized, rules and restrictions for the flight can be reviewed and a purchase option is provided on this Web page 660.

If instead the customer wishes to view the fares upon which the market summary 710 is based, the customer clicks on or otherwise inputs link 712. If a customer enters the link 712, fare list page 630*a* is displayed and the customer can view priced similar flights 741 from the fare server database. This list of priced similar inventory, known as the fare list, is based on flights recently known to have been available, e.g. within the last 48 hours, that span multiple dates, times, and airlines. On an Internet-based travel service, these low priced flights are derived by reviewing and saving search results from the many search requests that are processed everyday and from automated processes for searching. The fare list presents possible low-cost alternatives to the customer who is flexible on dates, times, airlines, stop-overs, restrictions, and refund options. If the customer wishes to view purchase details for one of these flights 741 from the fare list, the customer can click on the price 742 associated with the priced similar inventory 741.

FIG. 7F is an example of a fare list page 630*a*. Priced items of similar inventory 741*a*, 741*b*, . . . , and 741*z* are listed by flight times, length of stay and the like and are also sorted and ordered using these characteristics for easy consumer viewing. Each priced item of similar inventory 741*a*, 741*b*, . . . , and 741*z* has a respective price link 742*a*, 742*b*, . . . , and 742*z* which can be clicked on or otherwise input from the customer to check for availability for a particular item of priced similar inventory 741. In a preferred embodiment for an Internet-based travel service, a star 743 is provided next to prices 742 that are at least 15% less expensive than the average price of all prices 742.

If the customer enters a link 742 associated with an item of priced similar inventory 741, availability check page 650 is displayed. Passenger counts 705 for the priced item of similar inventory 741 are entered, and an availability check is made by clicking on or otherwise inputting link 751.

Figure 7D:
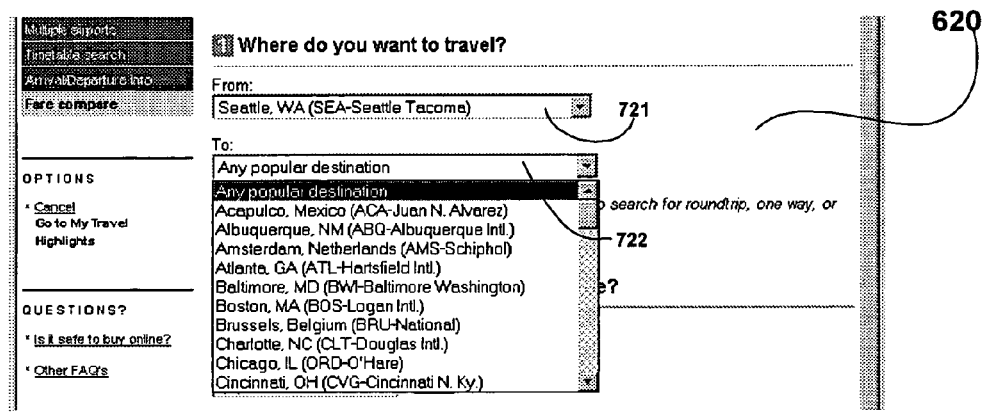
FIG. 7D is another example of a fare compare query Web page and corresponding user interface in accordance with the present invention.
Figure 7E:
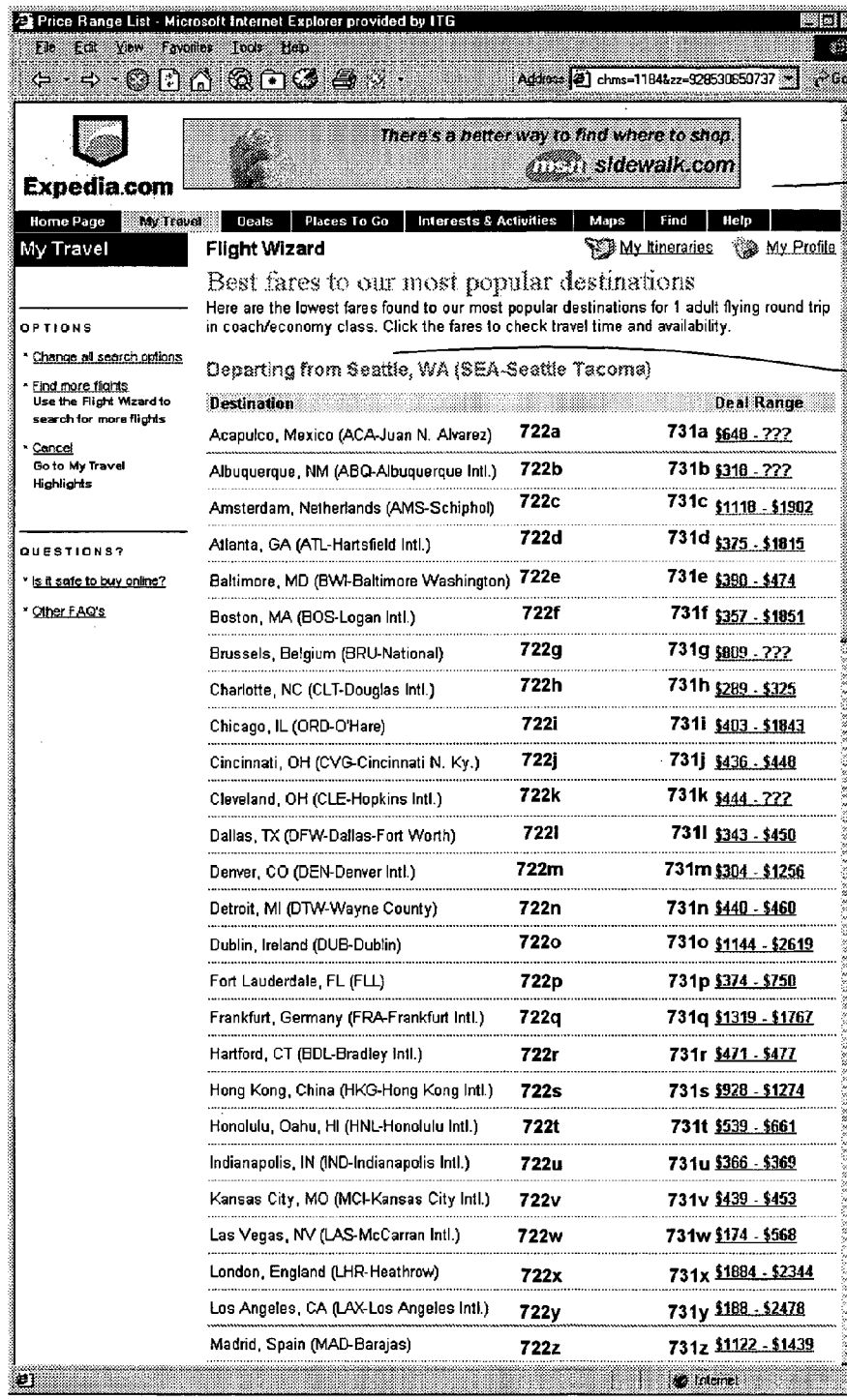
FIG. 7E is an example of a fares from origination Web page and corresponding user interface in accordance with the present invention.
Figure 7F:
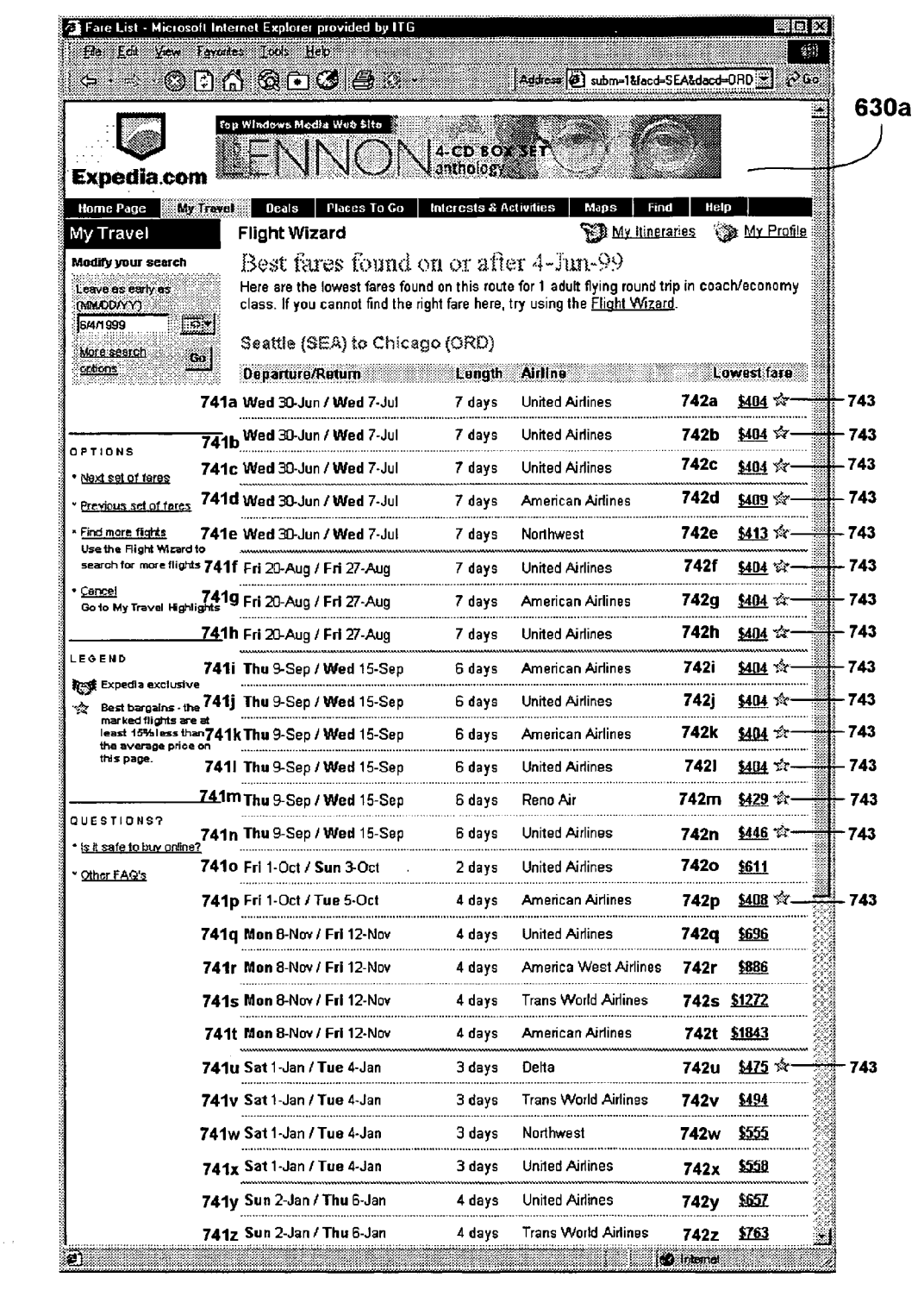
Figure 7G:
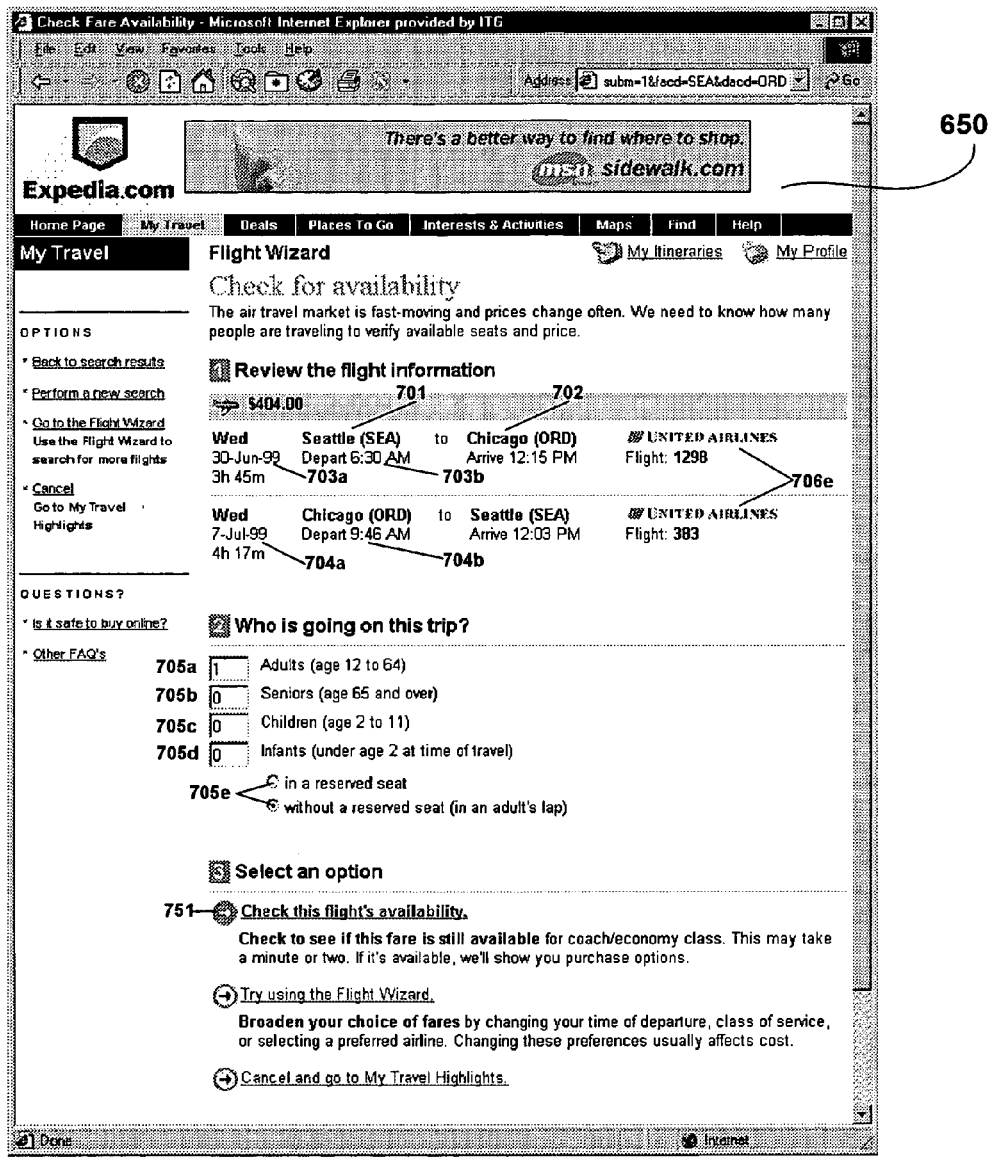
FIG. 7G is an example of an availability check Web page and corresponding user interface in accordance with the present invention.

FIG. 7G shows an example of an availability check page 650. Summary flight information such as origin 701, destination 702, leave date 703*a*, leave time of day 703*b*, return date 704*a*, return time of day 704*b*, and other criteria 706 are displayed for review. The customer enters in passenger counts 705 in terms of adults 705*a*, seniors, 705*b*, children 705*c*, infants 705*d*, and whether infants need a reserved seat 705*e*. Then the customer clicks on or otherwise inputs link 751 to cause an availability check to be performed for the specified inventory.

Figure 7H:
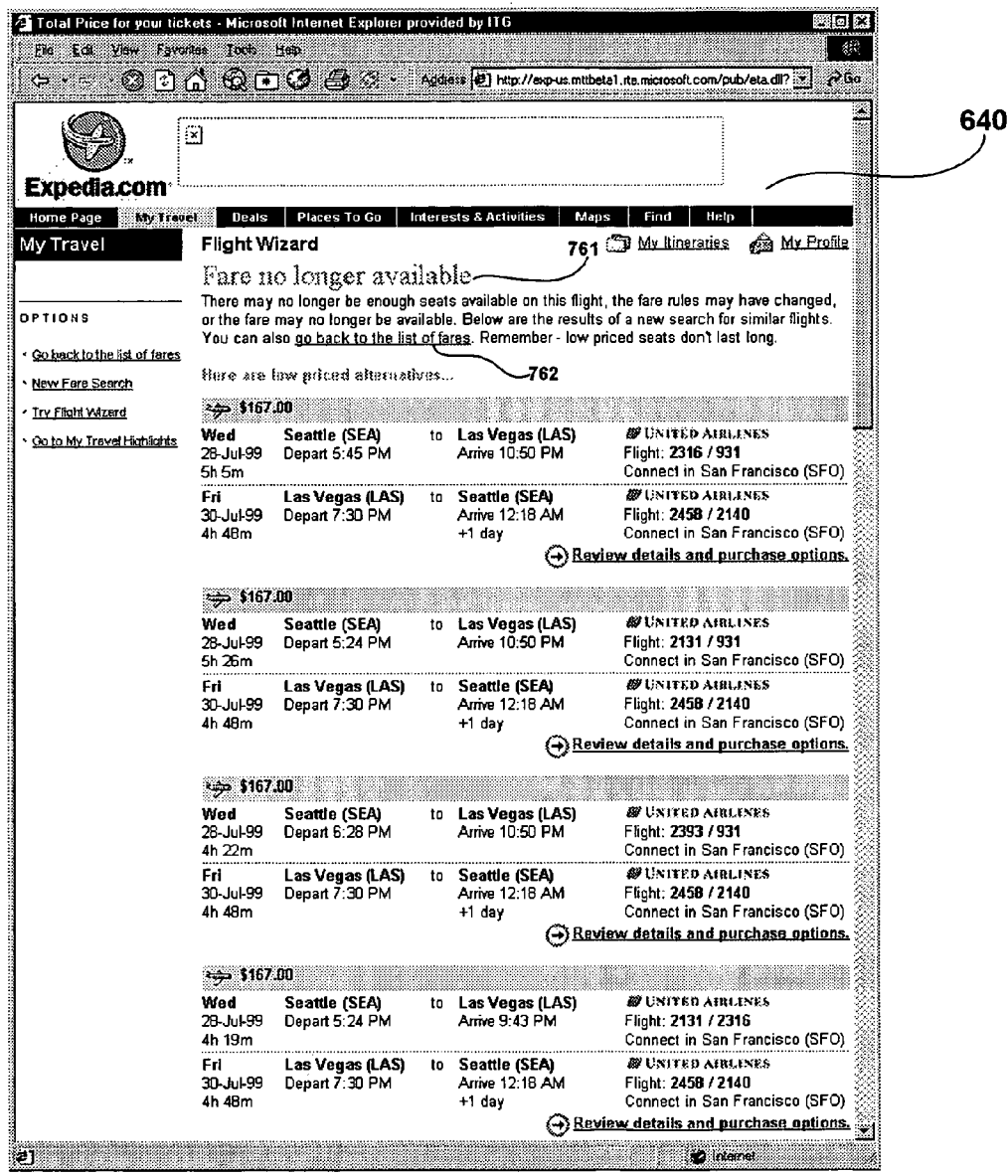
FIG. 7H is an example of a no longer available Web page and corresponding user interface in accordance with the present invention.

If link 751 is entered, a determination is made as to whether the inventory is still available for purchase at 655. This is accomplished by querying an up to date inventory database. If available, a determination is made as to whether the price has since changed. If the inventory is no longer available, as FIG. 7H shows, a no longer available page 640 is displayed, having a display 761 which informs the user that the inventory is no longer available, and the search results from search results page 640 are redisplayed. A link 762 is also provided giving the customer the option to return to the fare list page 630*a* having the fare list upon which the market summary 710 was based, without the item determined to have been no longer available. Additional availability checks can then be pursued by the customer via price links 742 for other priced items of similar inventory 741.

Figure 7I:
FIG. 7I is an example of a price change Web page and corresponding user interface in accordance with the present invention.
Figure 7J:
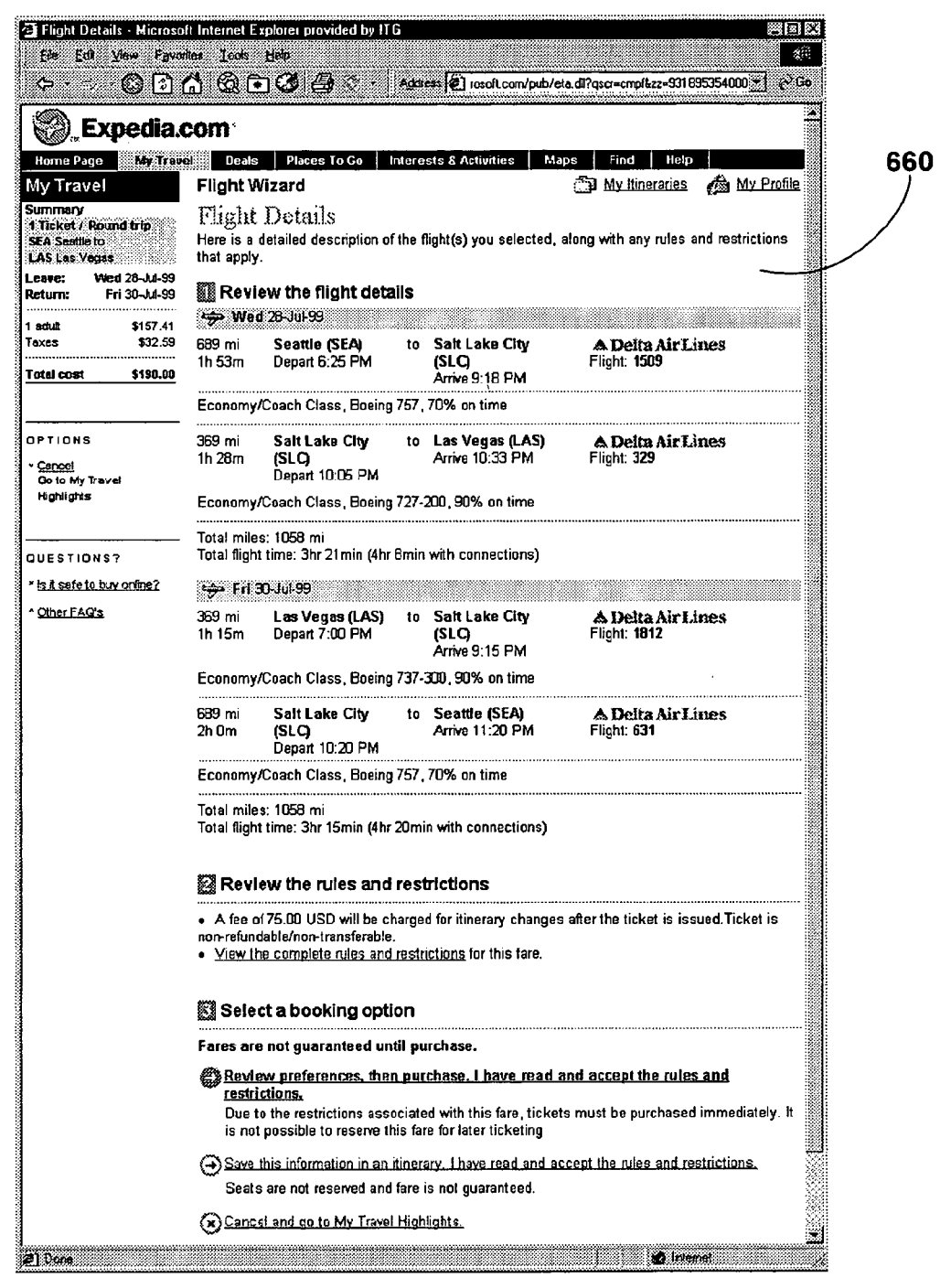

If a priced item of similar inventory 741 is still available, but the price has changed, the customer is apprised of this fact 771 in a price change page shown in FIG. 7I. The customer then has the option to purchase in a purchase page 660 at the new price. If a priced item of similar inventory 741 is still available and the price has not changed, the customer is given the option to purchase in a purchase page 660.

If a customer clicks on a fare compare link 600*b*, the Internet-based travel service begins a fare compare query technique. In a fare compare query page 620, the customer need only enter a flight origin 721 and an approximate departure date 723. The customer can optionally specify the destination 722. In a preferred embodiment, if no destination is specified, a list of popular destinations is chosen by the Internet-based travel service.

FIG. 7C shows an example of a fare compare query page 620. A customer enters an origin 721 and a departure date 723. If no destination 722 is specified, the default destinations are any popular destinations chosen by the Internet-based travel service, as shown in FIG. 7C. A search of the fare server database is then performed by clicking on or otherwise inputting search link 724.

FIG. 7D also shows an example of a fare compare query page 620. The difference from FIG. 7C is that a customer is in the process of pulling down a "pop-up" menu for selection of a specific destination 722. Thus, FIG. 7C and FIG. 7D serve to show that the destination does not have to be specified for a search to be performed.

When search link 724 is clicked on by the customer, a determination is made as to whether a specific destination 722 was entered at 625. If a specific destination 722 was entered by the customer in the fare compare query page 620, then a fare list page 630*a* is displayed having priced items of similar inventory based on the fare compare query criteria origin 721, destination 722 and approximate departure date 723. These items displayed as a result of a search of the fare server database. From the fare list page 630*a*, availability checks and the like are performed as described above.

If no specific destination was entered in the fare compare query page 620, then a fares from origination page 630*b* is displayed. Fares from origination page 630*b* contains market summaries 731 for origin 721/destination 722 pairs which are chosen by the Internet-based travel service, based on a list of popular destinations 722. If a customer is interested in the market summary 731 for a particular origin 721/destination 722 pair, the customer clicks on the market summary 731 which links to a fare list page 630*a* having a fare list of priced similar flights 741 upon which the market summary 731 is based.

FIG. 7E shows an example of a fares from origination page 630*b*. Origin 721*a* has been fixed by the customer in the fare compare query page 620. What follows are market summaries for origin/destination pairs including origin 721*a*/destination 722*a*, origin 721*a*/destination 722*b*, . . . , and origin 721*a*/destination 722*z*. Each of origin 721*a*/destination 722*a*, origin 721*a*/destination 722*b*, . . . , and origin 721*a*/destination 722*z* pairs thus has a respective market summary 731*a*, 731*b*, . . . , and 731*z*. The market summaries 731 on this page are termed a deal range. Clicking on a particular market summary 731*a*, 731*b*, . . . , or 731*z* displays a fare list page 630*a* that displays priced items of similar inventory for the selected market summary 731 to the customer based on specific origin, selected market summary destination and approximate time of travel.

In a second embodiment, the present invention can include other features as well. For example, the present invention can include a feature wherein the user can sort by price or date beyond or more narrowly than a range represented by market summary information. In addition to a "leave as early as" date, the user can also enter a "depart no later than" date. The market summary information can also be displayed on more pages as well. For example, although in FIG. 7F, the market summary for the fare list data is not displayed, it can be displayed anywhere on the page to provide the user with additional information about the listed fares. The provision of extra features and Web links to the fare list and market summary data can enrich the user experience.

Figure 8A:
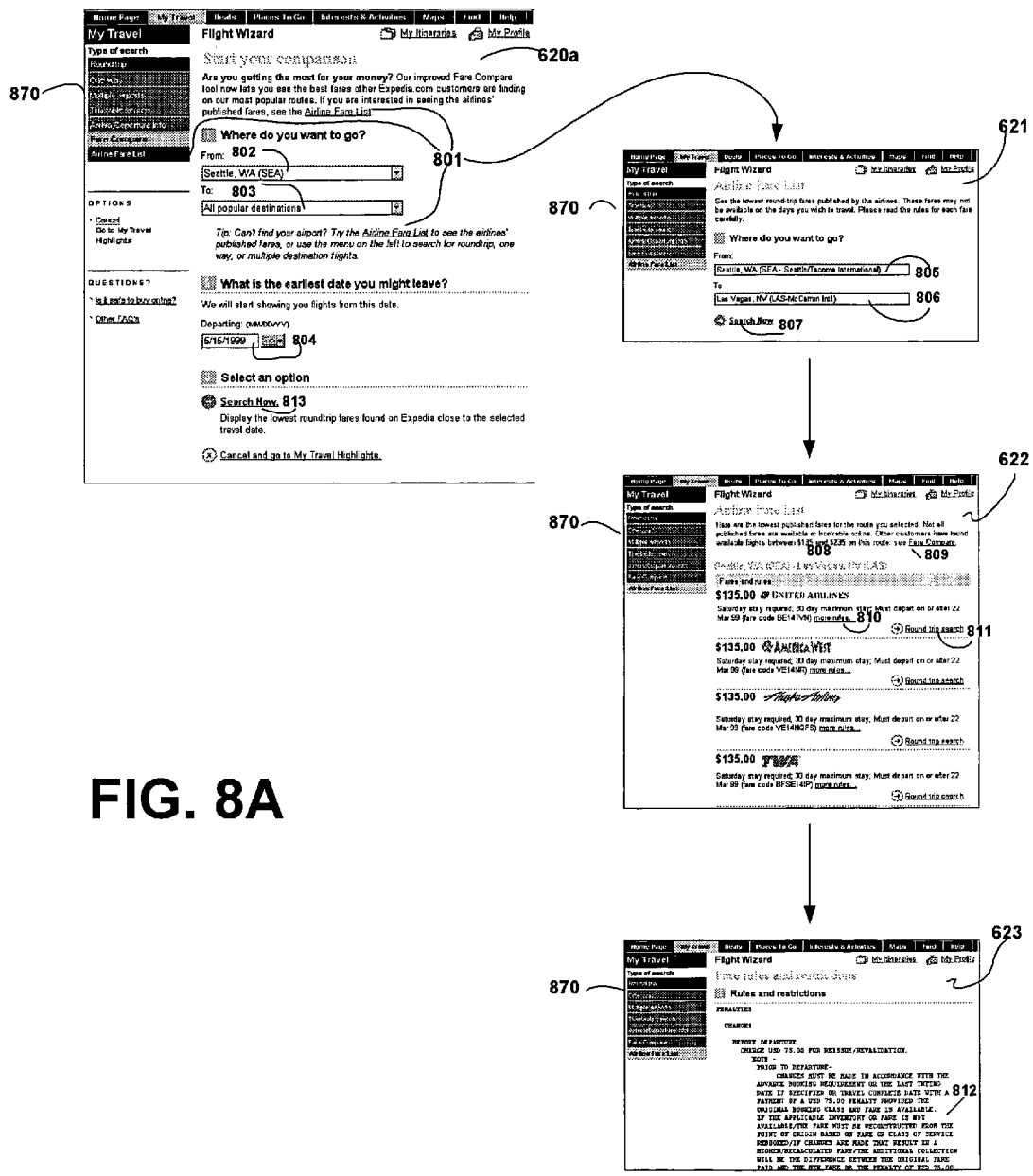
FIG. 8A is an illustration of an exemplary sequence of Web pages for the presentation of published fare information.

FIG. 8A illustrates a sequence of Web pages whereby a user can query about published fares. In Web page 620a, as described previously, a user can enter a departure city 802, a destination city 803 including an option to choose all popular destinations, and an earliest leave date 804. The user can perform a search by inputting link 813 based on the input. As an additional feature, however, a user can enter a link 801, which takes the user to a Web page 621 where the user can enter information regarding published fare information.

For Web page 621, a user enters the departure city 805 and a destination city 806 for a search performed by entering link 807. In the example, a published fare list is found for Seattle to Las Vegas trips. As a result, a search of fare server database 370 returns a result set regarding published fare information displayed on Web page 622.

Web page 622 shows market summary information 808 computed from the fare information returned from the fare server database 370. A link 809 is provided so that a user can perform a fare compare search as illustrated and described previously with respect to FIGS. 7A-7J or as described below with respect to FIG. 8B. Entries are shown displayed with a limited set of rules therefor matching the user's query. As shown, the supplier and various requirements for a published fare are provided. If a user wants to perform a more specific search regarding the published fare, a link 811 is provided for such a search. A link 810 is also provided so that more rules with respect to a published fare can be ascertained on a different Web page 623. Web page 623 contains more rules and restrictions information 812 for the published fare so that the user can be more informed about the inventory being presented. The particular layout and sequence can be formatted and divided among Web pages differently than shown. The example shown is for illustrative purposes only and demonstrates one such sequence in accordance with the present invention.

Figure 8B:
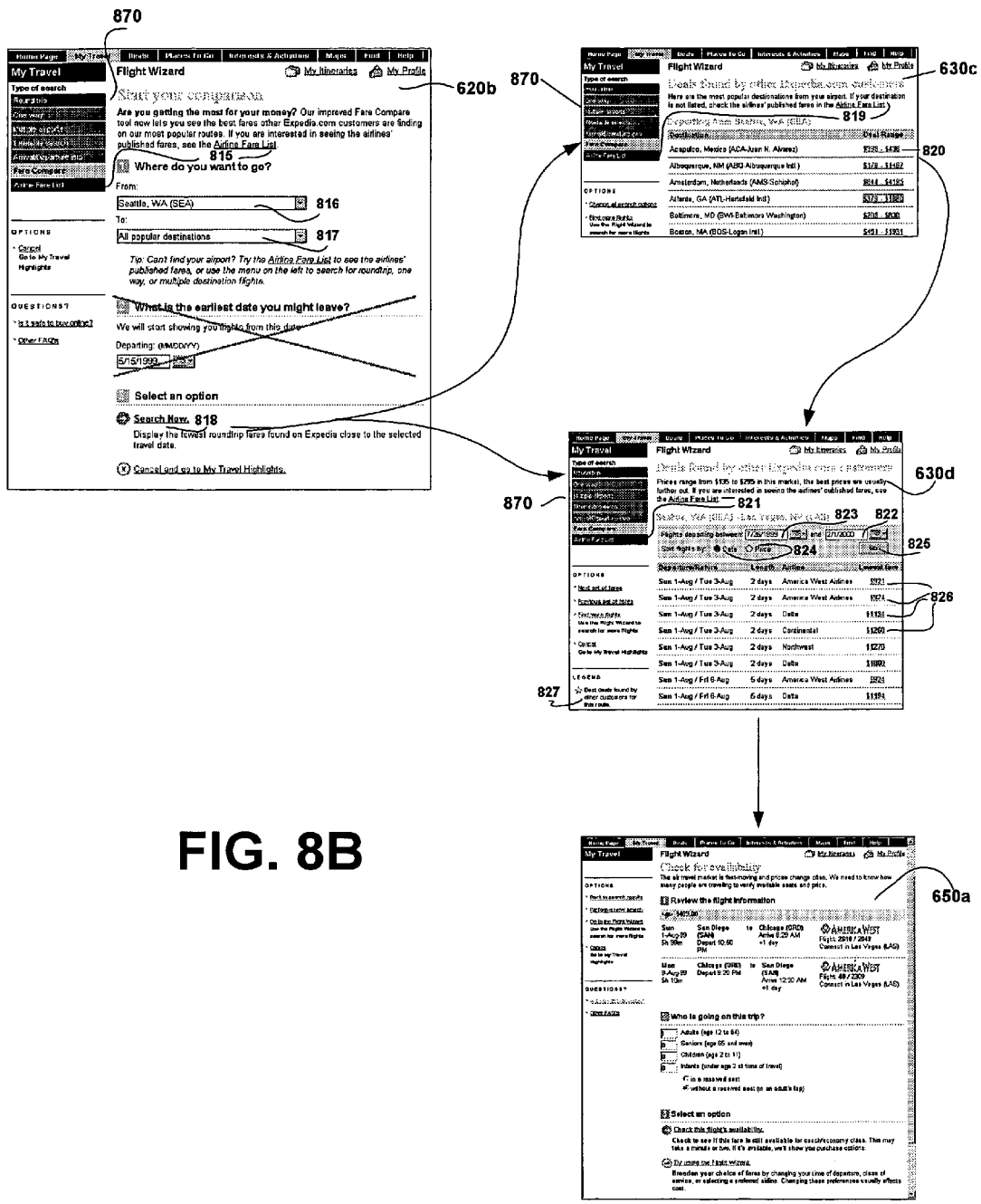
FIG. 8B is an illustration of a fare compare Web page sequence in accordance with the present invention.

FIG. 8B shows a fare compare page 620b, which has links 815 to the airline fare list information described in FIG. 8A. Thus, a link to the published fare information can be provided anywhere in a fare purchase sequence. This enriches the overall user experience by providing an option to the user to learn about a relevant market. A user enters departure city 816 and destination city 817 including an option to go to any popular destination. A difference from the previously described fare compare page 620 is that the earliest leave date is removed as an obstacle to searching. A predetermined assumption is made about dates of travel. For example, an assumption can be made that the starting date would be the same day as the user is entering information and the latest travel date is the last day of an airline published fare or the last day to book setting. Having entered departure city 815 and destination city 816, a user enters link 818 to search.

In the case of entering any popular destination as a destination city 817, a Web page 630c is presented after a search of the fare server database 370. Again, the user is presented with the option link 819 to see published fare information. A market summary link 820 is shown for each popular destination and the user can choose one such market by entering the link 820 for that respective market.

Web page 630d is shown if a link 820 of Web page 630c is entered by the user or if a user enters a particular destination for the destination city 817 on the search page 620b. Web page 630d contains fares returned from fare server database 370 for a particular city pair. The market summary information 845 for the city pair is presented. Again, a link 821 is provided for the user to optionally choose to be presented with published fare information. The fares 826 are displayed in a table format below a means to organize the table. For example, a user can enter dates for departure in a range format by specifying an earliest leave date 823 and a latest leave date 822. In addition, the table can be formatted by date or price as shown by 824. A 'Go' button 825 submits changes in dates 822 and 823 and sorting criteria 824. In the Figure, the table of Web page 630d is organized by date. When a Web page 630d is first shown, a preferred display initially sorts by price and the user can then enter the date sorting feature of 824 and preferably about 50 fares are shown. Also, a feature explanation 827 explains that stars are shown next to fares representing a predetermined percentage of fares that are lowest priced fares. A user can thus effectively and quickly arrange fares in a fare list in a manner suitable to the user's needs. As before, if one of the fares is desirable, a user enters link 826, whereby the user is taken to a screen that checks for availability of the fare by searching the database 350.

FIG. 8C shows an expanded view of Web page 630c having multiple market summaries 820 for various popular destination cities. These links 820 can be used to look at individual fares in a fare list Web page 630d. As shown, multiple links 819 are provided to the user allowing the user to find out about published fare information. These are located on the top, side and bottom of the Web page 630c. In addition, the user is given an additional option to perform a round trip query by entering link 840. Additional options can be provided as well.

FIG. 8D shows an expanded view of Web page 630d having displayed fares 826 for a market chosen by the user. In addition, a legend 827 tells the user which fares displayed are the best fares. In the example shown, stars 836 are placed next to the fares representing the best priced deals. Stars can indicate that the fare is less than or equal to the average fare minus fifteen percent of the average fair. The average fare can be computed by traditional averaging and weighted averaging techniques or the average fare can be computed quickly by taking the mid value between the lowest and highest fare. Also, this calculation need not take place for all fares returned from fare server database 370. For example, only fares being displayed could be taken into account during calculation. In a preferred setting, a flight gets a star if it is one of the lowest prices in the market, as determined by a fare threshold value. The threshold value is calculated by multiplying 0.15 times the difference between the highest market price and the lowest market price, and then adding the resulting value to the lowest market price. A star is then placed next to a fare returned from fare server database 370 if the fare is less than or equal to the threshold value. For example, if the market low price is $100 and the market high price is $200, then the threshold value for determining which fares have stars is $115, i.e all flights at or below $115 receive a star proximate to the price.

The market summary information 845 for the chosen market is also displayed. At the bottom of the page, additional options are provided to the user. For example, if more fares are available that are not shown, the user can enter link 837 to see the fares that leave later. Conversely, the user can enter link 838 to see fares having an earlier departure date. Default dates include the date of query as the earliest departure date and the setting for the last day to book for the latest date of departure. A user can enter link 839 to perform a round trip search or enter link 839 in order to change airport pairs. Other options can be made available as well.

Figure 8E:
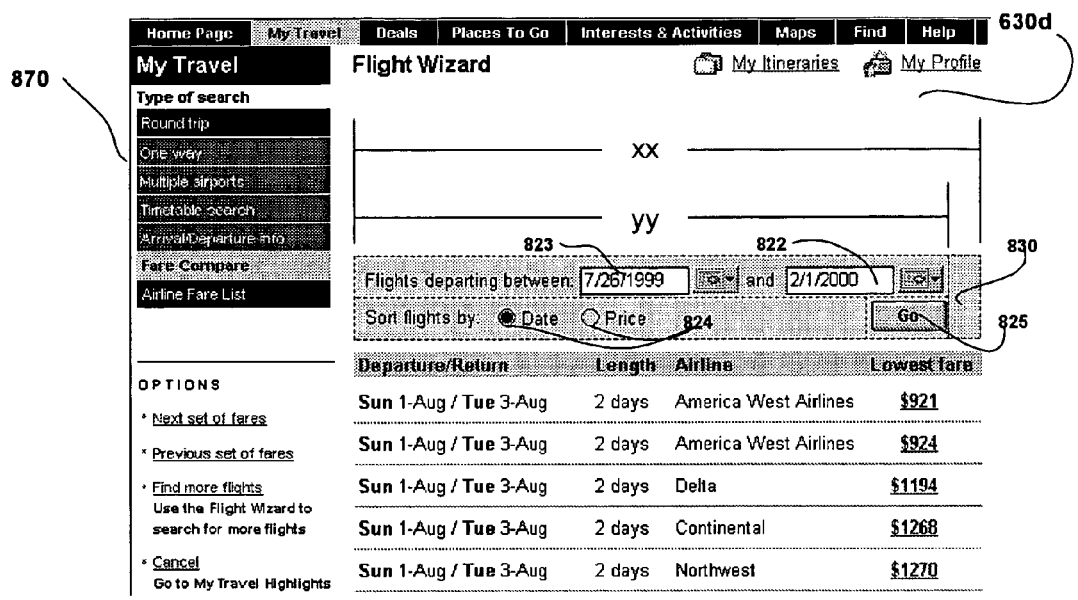
FIG. 8E is an illustration of display features of a Web page presenting fare information in accordance with a second embodiment of the present invention.

FIG. 8E is a cutoff view of Web page 630*d* and illustrates a layout in accordance with the present embodiment. Since the fares in the fare list are presented in a tabular format, the sort feature 824, flight dates 822 and 823, go button 825 and buffer region 830 are presented above the table to be of the same width xx as the table. Buffer region 830 is provided such that the features including the sort feature 824, flight dates 822 and 823 and go button 825 are lined up to the edge of displayed prices, which is shown by distance yy from the left side of the table. The go button 825 is about as wide as prices shown. A predetermined amount of space is provided between text and borders. FIG. 8E thus illustrates an embodiment of a user interface and the parallelism/connection between the features of the present invention and the table that they modify.

Figure 8F:
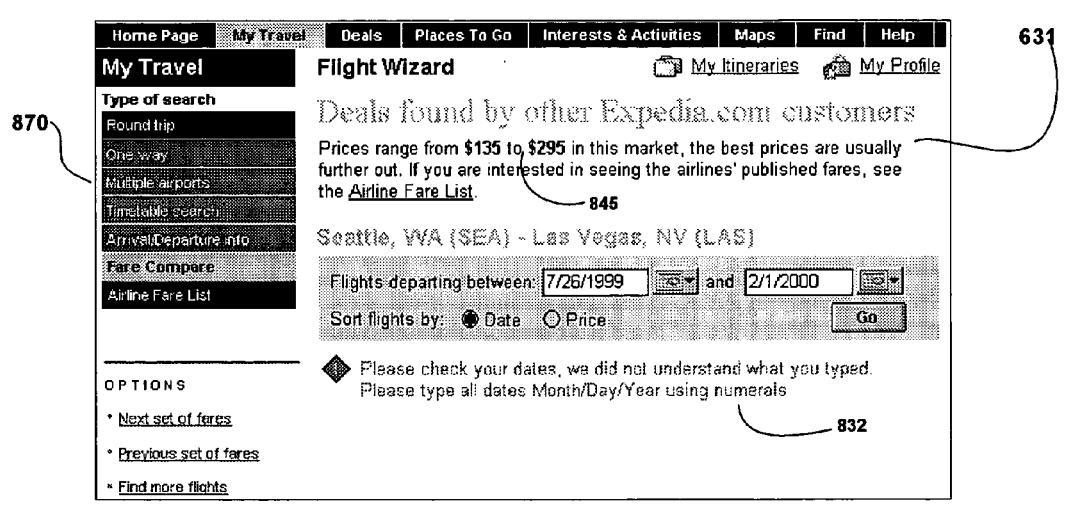

FIG. 8F illustrates a Web page 631 wherein a user has entered an invalid departure date. The market summary 845 is still displayed, but an error message 832 is displayed prompting the user to re-enter a date.

Figure 8G:
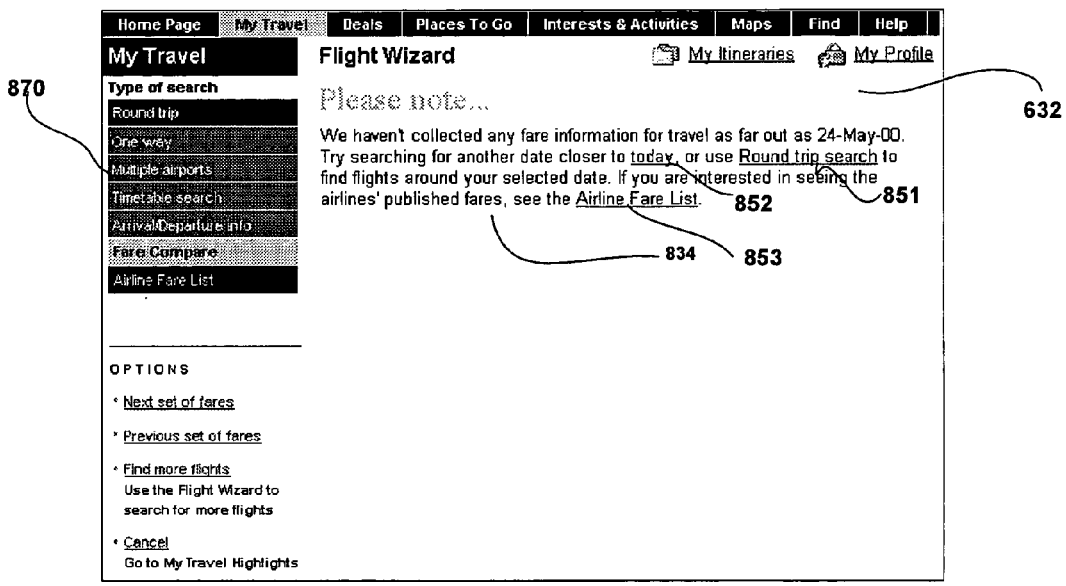
FIG. 8G is an illustration of an error message Web page in accordance with a second embodiment of the present invention.

FIG. 8G illustrates a Web page 632 wherein another type of error message is displayed. For the case where a user has entered a date for which no fare information is available, an error message 834 is displayed. An optional link 852 is provided so that the user can perform a search closer to the current date. The user can also perform a round trip query search by entering link 851, or as described previously, the user can be choose from published fare information by entering link 853. In this fashion, although an error has occurred or fares are not available, the flow can be maintained and the user is presented with alternatives.

Although specific links to other searches and features have been referenced with respect to individual Web pages, options can be provided on any Web page for the user to perform any type of search offered by the travel service. For example, navigation tabs 870 can be provided on any Web page as shown in the figures.

Although the above is described in terms of roundtrip airlines tickets in an Internet-based travel service, the same technique could be applied to one-way airline tickets, multiple destination airline tickets, hotel rooms, or any product offered by multiple suppliers where a query is made and alternate products can be presented that are responsive to the customer query even though some search criteria are relaxed or removed.

Fare Server Database

Figure 9A:
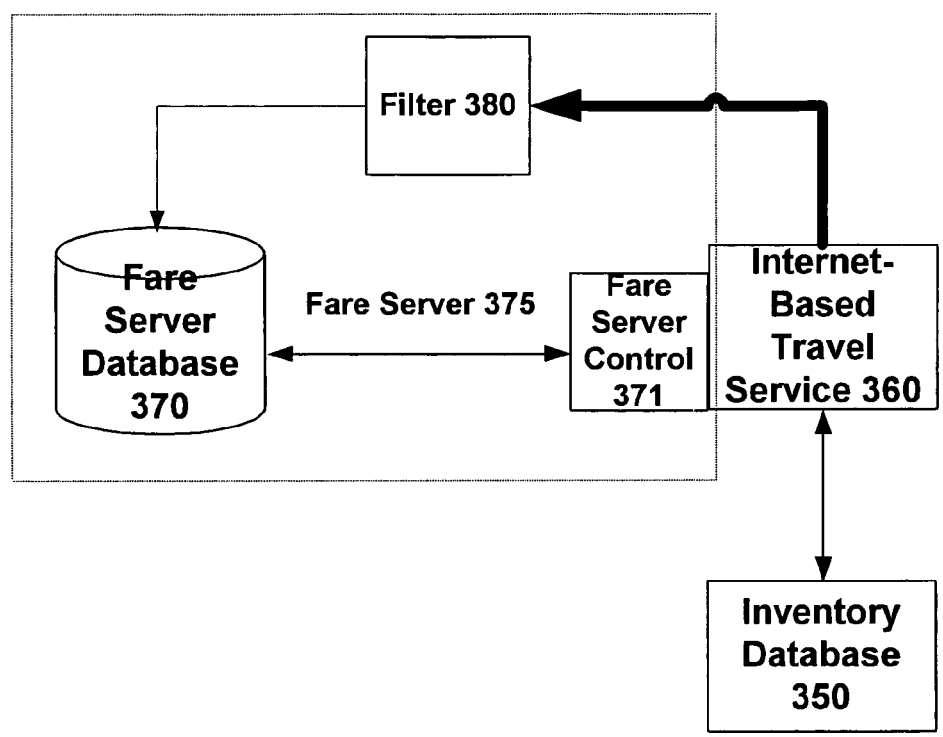
FIG. 9A is a block diagram of the fare server and fare server database in accordance with the present invention.

The fare server database 370 has thus far been described with respect to a searching operation for additional inventory recently known to have been available. The network-based service also needs a way to interact with the fare server database 370 for updating, retrieving and managing data. Thus, in a preferred embodiment, as shown in FIG. 9A, the present invention is implemented with a fare server 375 comprising a database 370 and a fare server control 371 which carries out computer-executable instructions for managing, accessing, and updating the fare server database 370. The fare server 375 is a combination of the database 370 and a fare server control 371 embodying code for interacting with the database 370. Although the filter 380 is explicitly shown as a separate module of fare server 375, the filter 380 could be embodied in the Internet-based travel service 360, or in the fare server control 371. Fare server 375 communicates with Internet-based travel service 360, which communicates with inventory database 350. Fare server database 370 can take the form of a variety of storage mediums. For example, the database memory could be a cache memory, RAM, ROM, high density storage media, or other high volume storage media that can be accessed quickly and efficiently.

One objective that must be satisfied is population of the fare server database. Without stored inventory, there is nothing to search. Thus, in the example of an Internet-based travel service, a subset of the search results produced by customers shopping on the service are stored in the fare server database 370. The fare server database 370 is also populated by the performance of automated search processes of inventory database 350 initiated by the fare server control 371 and implemented by the Internet-based travel service 360. Alternatively, the Internet-based travel service 360 could initiate these automated searches. The fare server 375 is not only a repository for recently available fare and related flight information, but it is also responsible for ensuring that only the most up-to-date fares are returned when a request is made.

The Internet-based travel service 360 adds the fares and related flights that are not purchased by a consumer to a queue for insertion to the fare server database 370. The Internet-based travel service 360 does some preliminary filtering before sending information to the fare server database 370 via filter 380. Filtering criteria, in the case of airline tickets, may include a restriction to roundtrip flights only i.e., one way and multiple destination itineraries will be filtered out. Filtering criteria may further include adult passenger type codes only i.e., senior, children, infant, and infant without seat fares will be filtered out. If the fare server 375 can differentiate between fares for an itinerary with multiple passenger types then the fares having adult passenger type only are stored in the fare server database 370. A further filtering criterion may be that all flight legs in the itinerary must be economy i.e., first and business class itineraries will be filtered out and not stored in the fare server database 370. Also, itineraries with mixed classes of service will be filtered out. An additional filtering criterion may be that itineraries with more than four flight legs will be filtered out. With this criterion, itineraries with a single leg for the outbound and three legs for the return part of the itinerary will still be stored in the fare server database 370.

There are also several configurable settings for additional filtering to be performed in the fare server 375. In the case of travel products such as airline tickets, these settings include airport pairs i.e., the set of supported cities for a travel product will be maintained in the fare server database 370. A travel product generally is an item purchased in connection with travel, such as airline tickets, rental cars, hotels, rail services and the like. Travel products have geographical locations associated with them, such as airport cities in the case of airline tickets. The fare server 375 should abstain from filtering via filter 380 the same set of airport pairs set by the settings. Another setting could be the number of fares stored from a single flight price request. Since the number of fares returned in a result set from inventory database 350 can be and generally is greater than one, the number of fares sent to the fare server database 370 should be configurable. The lowest fares should always be stored in the fare server 375, but the ability to limit a voluminous result is valuable because overpopulation of the fare server database 370 may be undesirable.

Items stored in the fare server database 370 have certain data elements. The Internet-based travel service 360 stores in the fare server database 370 all information for re-pricing a flight by the inventory database 350. This includes the fare to be re-priced, the currency code, special fare type (describes the pricing engine to be used), contract number, and any information necessary for re-pricing a flight in inventory database 350, which could be a global distribution system. In certain cases, an error message is returned from a pricing or re-pricing that indicates that no seats are available for a particular itinerary. These messages are sent to the fare server control 371 that accordingly removes the item from memory of the fare server database 370.

The fare server control 371 employs stored procedures that support communication from the Internet-based travel service that can insert, update, or invalidate fares and related flights. For insertion, the Internet-based travel service 360 sends a fare that is not currently in the fare server database. For an update, a fare is currently in the fare server database with identical flight details to a flight returned from a query sent by the Internet-based travel service 360 to the inventory database 350, but the pricing information may have changed. The fare server 375 must be able to update the fare information with the new fare sent by the Internet-based travel service 360. For invalidation, a fare is currently in the fare server database 370 with certain flight details that are not available. The fare server 375 must be able to invalidate the fare if the Internet-based travel service 360 can no longer find a valid fare with identical flight details. When the system receives an "unable to price" message, any fares booked on the same itinerary are invalidated in the memory of the fare server database 370.

Throughput between the Internet-based travel service 360 and the fare server database is also important. For purposes of a preferred implementation, it is more important that a particular insertion or update does not bottleneck the communication process than that every fare get inserted to the database. The fare server 375 thus effectively manages throughput, allows communication performance monitoring, and has a mechanism to throttle if performance degrades.

As mentioned, only a limited number of the fares from the Internet-based travel service 360 are inserted into the fare server database 370. One reason is to prevent the fare server database 370 from becoming too large thereby burdening a reasonable management. The primary means of limiting the data stored in the case of travel products can be city pair. Under these circumstances, only the most popular city pairs are supported. This has two benefits: it limits the potential size of the database and helps to ensure good coverage for the airport pairs that are supported.

The fare server 375 also has a set of predetermined rules to determine when fares in the memory of the fare server database 370 should be invalidated. Once a fare is invalidated, it is no longer available for return when the data is requested. Rules for invalidating fares in the memory can include invalidating when the actual date is greater than the departure date. In other words, when the flight has departed, it is invalidated. Another rule could be that a fare is invalidated when an expiration checkpoint has passed. Expiration checkpoints indicate the number the days before departure that a fare can be maintained at that fare. For example, if the current date is October 1 and a fare is inserted into the database with a departure date of October 10, then the number of days before departure is 10 days. If an expiration checkpoint for this fare is seven, then if the fare has not been invalidated due to another predetermined rule, it will be invalidated on October 4, when the number of days until departure is seven. A default set of expiration checkpoints is in place for all markets. These checkpoints can be overridden. Another rule could be that a fare is invalidated when the number of fares in the fare server database 370 has exceeded the limit for a city pair and date pair combination. In these cases, the highest fares for the city pair and date pair combination should be invalidated. Another reason to invalidate a fare could be that a new fare was found for the same itinerary. If a new fare was found for the same airport pair and date pair combination, then the fare should be updated.

Simply because a fare has been invalidated does not mean that it has been removed from the fare server database 370. Thus, once fares are invalidated, the fare server control 371 needs to periodically purge the invalidated fares from the fare server database 370. In a preferred implementation, this is a regularly scheduled process.

Figure 9B:
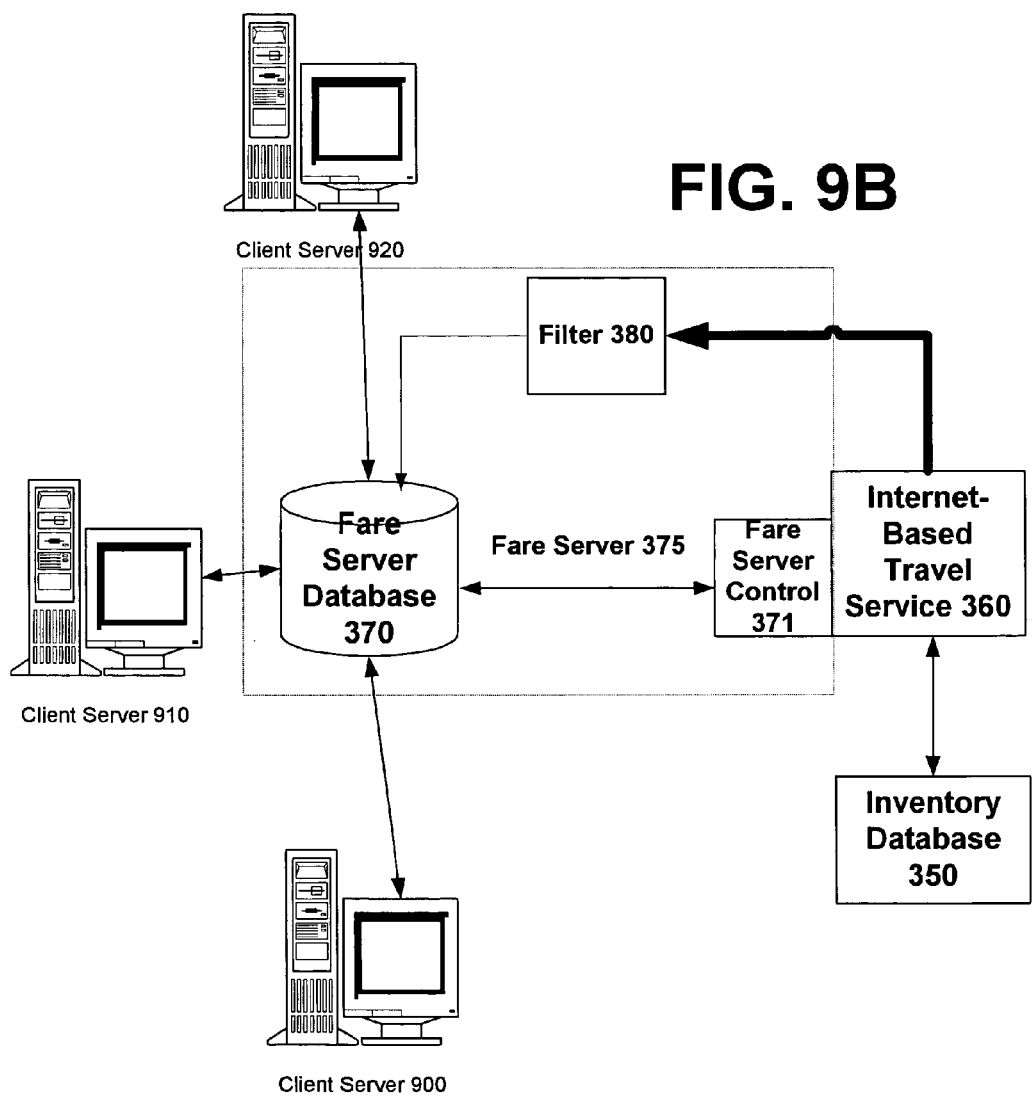
FIG. 9B is a block diagram of the fare server and fare server database connected to other client services in accordance with the present invention.

FIG. 9B shows an embodiment of the present invention wherein the fare server 375 is connected to client services 900, 910 and 920 operating on other server computers. In a preferred implementation of the present invention, the Internet-based travel service 360 is not the only service in communication with the fare server 375. Other services such as client servers 900, 910 and 920 use fare and availability information from fare server database 370. One such service, for example, could be a service that regularly emails pricing information about consumer specified inventory to a consumer. Thus, the ability to summarize the data stored in the fare server database 370 for ease of use by these other services is an advantage of the fare server database 370. In some cases, some client services require a summary format for use thereby. Also, time-critical clients that require fare summary data are dependent on the summarization of data in the fare server database 370, and also dependent on fast and efficient access to the data.

Thus, the fare server 375 and particularly the fare server control 371 should schedule fare server database 370 management based on these client dependencies. For example, if fares for any supported city are missing, execution of one or more searches are requested of the Internet-based travel service 360 for search of inventory database 350 to populate the fare server database 370. A direct request by the fare server 375 could also be implemented. This update could be performed, for example, as follows: The fare server control 371 calls a stored procedure that creates a list of missing city pairs. Based on certain parameters such as the default number of weeks of lead-time, default days of week, and the like, a stored procedure determines departure and return dates and times for searches. For each city pair, departure date and return date, the fare server control 371 sends a request to the Internet-based travel service 360 for execution of a query to inventory database 350. A predetermined module for insertion of the returned fares and associated flights is then executed in order to add the fares into the fare server database 370. The search can include economy, roundtrip, and single adult passenger as parameters.

The fare server control 371 must also execute a stored procedure or module for population of the fare summary table of the fare server database 370 for use by client services. The successful population of the summary table of the fare server database 370 is important and thus success is monitored by the fare server control 371. Failure to populate the summary table is considered an important event, and available computing resources are allocated accordingly. One client service, an email service, uses results recently added to the fare server database 370. For each city pair requested by a subscriber to this service, a computer executable module is performed. For given requested inventory, departure airport, arrival airport, passenger type code, itinerary type, and class of service, null is returned from this module if no fares are found and the lowest fare found is returned from the module otherwise.

If the fare server database 370 does not contain a fare for a particular city pair, then the service issues a search request for the city pair and a default set of dates and times. This can be accomplished via the fare server 375 which can make a request through the Internet-based travel service 360 to the inventory database 350, or a request can be made by the client service. The defaults can include the number of weeks of in advance of a flight departure, the day of week for departure, the minimum length of the trip, the departure time, and the return time. For an example, default settings could be that today is Friday, October 9, the advance purchase is six weeks, the departure day of week is Tuesday, the departure time is 5 p.m., the length of the trip is eight days, and the return time is 5 p.m. A search would be performed using these default settings.

As mentioned, the fare server database 370 has summary data for servicing client services. In the case of a travel product, the summaries include at least the city of origin, the arrival city, the departure date and time, the return date and time, the supplier, the price, and the currency code. In a preferred implementation, there is a single row in a summary table for each airport pair. As mentioned, the table should be populated with a high priority.

In the case of travel products the fare server 375 supports a subset of the airports that are also supported on the Internet-based travel service 360. Fare server airports can be categorized as origin airports, destination airports, or as both origins and destinations. If new airports need to be supported by the fare server 375, then the airport lists are added via the Internet-based travel service 360 or directly input into the fare server 375 for support therein. Airport data may also be placed in cache memory on the server computer.

Fares are the primary data stored and maintained by the fare server 375. The fare server 375 supports a set of queries that allow client services to retrieve one or more fares. For example, a query could be made based on returning the lowest fare for a given date period or a query could be made based on retrieving a defined number of fares after a given departure date with the lowest fares.

The fare server 375 can return limited details about the item of inventory. In the case of a travel product, this may include the departure date and time, the return date and time, and carrier information. The fare server 375 can also retrieve the exact flight details associated with a particular fare. The fare server 375 stores all of the information required to re-price a flight and is able to display the same information that appears on the flight results screen of the Internet-based travel service 360. The flight duration is also displayed in the flight details retrieved from the fare server database 370. This duration is either stored in the fare server database 370 or calculated before display.

Thus, the fare server 375 must be able to handle client services performing requests for searches of the fare server database 370. As indicated in FIG. 6, a fare compare query performed on a fare compare query page 620 makes such a request to the fare server 375 when search link 724 is input. In that case, the request comprises a query for a set of fares for a given city pair for a departure after a specified date. When a fare compare query is received from Internet-based travel service 360, the fare server control 371 retrieves a specified number of fares and related high-level flight information after a specified departure date. In a preferred embodiment, the returned result set of a fare compare query is sorted by departure date and fares having the same departure date are sorted by the return date.

Once a consumer wishes to see all of the flight details beyond just high level information contained in the fare summary table, additional information must be returned from the fare server 375. Thus, the fare server control must have an object for retrieving all flight information for a given fare in the summary fare list.

As previously discussed, Internet-based travel service 360 uses the fare server 375 to create a market summary. This data is reflected on search results pages in a price range. In the case of a fare request, where an airport pair and date range are input, the fare server control 371 retrieves the minimum and maximum fare within the date range. In addition to the high and low fare, the query returns the currency code, and the earliest and latest departure dates that are found in the fare server database 370.

As discussed above, however, there are other client services that make requests and thus query for data from fare server database 370. For example, a home page for a business could query the fare server 375 for a few popular or inexpensive fares for display to the consumer in response to a request for inventory or even without a request. A service that displays information about a part of the world and its attractions could also list fares to that part of the world by querying the fare server 375. The possibilities are limitless.

Thus, these services have the ability to query the fare server 375 for the lowest fare for certain markets. Other services display fares from a single departure airport to a set of destination airports. These services query based on the origin. Still other services display fares to a destination airport from a set of departure airports. These services query based on the destination. Thus, it is clear that a variety of services make a variety of queries and thus the fare server in turn has the capability and flexibility to meet different demands. A query to the fare server 375 returns from the fare server database 370 at least an array of data of airport codes and fares and the number of items returned in the array.

In addition to clients such as the Internet-based travel service 360 that "pull" or query for data from the fare server 375, the fare server also pushes data to a number of clients e.g., an emailing service. The fare server 375 maintains a list of these clients, as well as their data requirements. The fare server 375 allows clients to be connected and disconnected easily. In the case of pushing data to a client, the client specifies which city pairs it requires and how often it requires a new export from the fare server 375. In addition, each client provides instructions or code to pull the content required from the fare server database 370, to output data in a defined format, and copy it to a specified location for the client. This typically involves storing a tab-delimited text file, or the like to a location specific to that client and product setting. Also, the fare server 375 periodically makes a check as to whether any client services should be started. Once it is determined that a particular service should begin, the fare server 375 calls the code provided by that client for that particular client.

Figure 10:
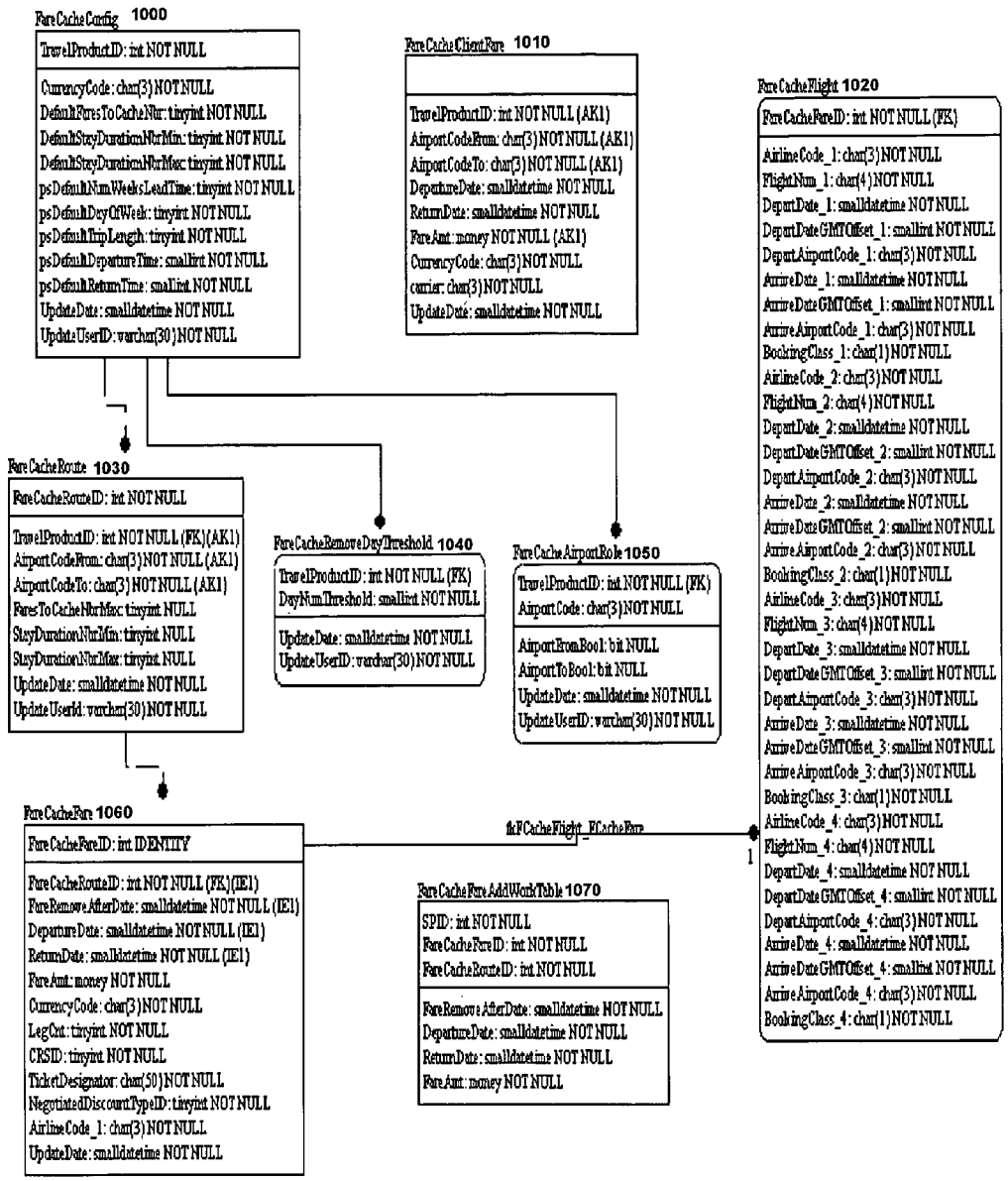
FIG. 10 shows an exemplary data structure for a travel product in accordance with the present invention.

FIG. 10 shows an exemplary data structure for a travel product in accordance with the present invention. As mentioned, a travel product is a product having a geographical characteristic and is connected to travelling in some manner. As shown, the data structure is divided into different components. FareCacheConfig 1000 contains global fare server database configuration information, and it is specific to a travel product. FareCacheClientFare 1010 is a summary table containing snapshots of maximum and minimum fares from the FareCacheFare 1060 table for each airport pair, e.g., FareCacheRoute 1030 entries. It is used typically by client services. Identical entries are not made in this table. FareCacheFlight 1020 stores the itinerary for a given fare. FareCacheRoute 1030 stores airport pairs of origin airports and destination airports, thereby designating a route. Fare- CacheRoute 1030 is specific to a travel product. FareCacheRemoveDayThreshold 1040 stores threshold day numbers and is used in removing a fare from the database. When the initial departure date for a trip minus the current date is equal to one of these threshold numbers, it is invalidated and subsequently removed from the fare server database 370. FareCacheAirportRole 1050 stores a list of airports and their role as an origin, destination, or both and is specific to a travel product. FareCacheFare 1060 stores fare information for a given roundtrip route. FareCacheFareAddWorkTable 1070 is a work table e.g., for temporary variables, calculation, swapping and the like, used when adding fares for optimizing performance.

Thus, the present invention greatly enhances the consumer experience by providing an improved system for pricing dynamic inventory in a way that provides information about inventory similar to consumer specified inventory from a database containing information about inventory recently known to have been available. The consumer can also view fare lists and market summaries for the fare lists from the database without being specific in a query.

While the present invention has been described in connection with the preferred embodiments of the various figures, it is to be understood that other similar embodiments may be used or modifications and additions may be made to the described embodiment for performing the same function of the present invention without deviating therefrom. For example, although reference is made to airline tickets or travel products being priced by an Internet-based travel service, the present invention applies to any service which offers pricing services for dynamic inventory whereby the consumer benefits from market summary information. Additionally, while the present invention has been described with respect to an Internet-based travel service, the present invention can be applied to any service that vends dynamic inventory. Therefore, the present invention should not be limited to any single embodiment, but rather construed in breadth and scope in accordance with the recitation of the appended claims.

What is claimed is:

1. A computer-implemented method for pricing dynamic inventory, the method comprising:
    under control of one or more configured computer systems;
    accepting information input specifying characteristics of an item to be priced;
    retrieving, from a first database of dynamic inventory, a first pricing result set for the item that satisfies the specified characteristics;
    automatically determining relaxed specified characteristics by removing at least one characteristic from the specified characteristics according to one or more predetermined rules, wherein the relaxed specified characteristics are determined automatically without receipt of additional information input specifying characteristics of the item to be priced;
    retrieving, from a second database of dynamic inventory that is different than the first database, a second pricing result set for the item that satisfies the automatically determined relaxed specified characteristics, wherein the second database comprises dynamic inventory that has been returned from prior searches of the first database and is stored in the second database for less than a selected time period;
    preparing market summary information from said second pricing result set for the item, wherein said market summary comprises prices; and
    displaying the first pricing result set for the item and said prepared market summary.

2. A computer-implemented method for pricing dynamic inventory according to claim 1, wherein the second database consists essentially of dynamic inventory that has been returned from prior searches of the first database and is stored in the second database for less than the selected time period.

3. A computer-implemented method for pricing dynamic inventory according to claim 1, wherein the second database is automatically updated with dynamic inventory retrieved from said first database.

4. A computer-implemented method for pricing dynamic inventory according to claim 1, wherein said method is implemented on an Internet-based travel service.

5. A computer-implemented method for pricing dynamic inventory according to claim 4, wherein said Internet-based service comprises a Web site capable of displaying information to a consumer and receiving offers from the consumer.

6. A computer-implemented method for pricing dynamic inventory according to claim 1, wherein said first database is a global distribution system.

7. A computer-implemented method for pricing dynamic inventory according to claim 1, wherein said first database comprises a plurality of databases, each different from said second database.

8. A computer-implemented method for pricing dynamic inventory according to claim 1, wherein said market summary information further comprises a lowest price, a highest price, and an average price.

9. A computer-implemented method for pricing dynamic inventory according to claim 1, wherein said second pricing result set comprises a departure city characteristic.

10. A computer-implemented method for pricing dynamic inventory according to claim 1, wherein said second pricing result set comprises a departure city and a destination city characteristic.

11. A computer-implemented method for pricing dynamic inventory according to claim 1, wherein said second pricing result set comprises a departure city, a destination city, and an earliest departure date characteristic.

12. A computer-implemented method for pricing dynamic inventory according to claim 1, wherein said second pricing result set comprises a departure city, a destination city, an earliest departure date, and a latest departure date characteristic.

13. A computer-implemented method for pricing dynamic inventory according to claim 1, wherein lowest priced displayed items, as determined by a prescribed algorithm, are displayed differently than other priced items.

14. A computer-implemented method for pricing dynamic inventory for a user, the method comprising:
    under control of one or more configured computer systems,
    receiving information input specifying a selected number of characteristics of an item being priced;
    obtaining a first pricing result set from a search of a first database of dynamic inventory according to the received information;
    automatically obtaining a second pricing result set in response to obtaining the first pricing result set from a search of a second database of dynamic inventory, different from the first database, wherein the search of the second database contains less than the selected number of characteristics and wherein the second pricing set is obtained automatically without receipt of additional information input specifying additional characteristics of an item to be priced;

preparing market summary information for the first pricing result set from the second pricing result set; and outputting, on an output device, the first pricing result set for the item and the market summary information.

15. A computer-implemented method according to claim 14, wherein the second database comprises dynamic inventory that has been returned from prior searches of the first database and is stored in the second database for less than a selected time period.

16. A non-transitory computer-readable medium having encoded thereon instructions, wherein the instructions, when executed by a computing apparatus, cause the computing apparatus to:

accept information input specifying characteristics of an item to be priced;

retrieve from a first database of dynamic inventory, a first pricing result set for the item that satisfies the specified characteristics;

automatically determine relaxed specified characteristics for the item to be priced by removing at least one characteristic from the specified characteristics according to one or more pre-determined rules, wherein the relaxed specified characteristics are determined automatically without receipt of additional information input specifying characteristics of the item to be priced;

retrieve from a second database of dynamic inventory that is different from the first database, a second pricing result for the item that satisfies the relaxed specified characteristics, wherein the second database comprises dynamic inventory that has been returned from prior searches of the first database is stored in the second database for less than a selected time period;

prepare market summary information from said second pricing result set; and display the first pricing result set for the item and said market summary information.

17. A computer-readable medium according to claim 16, wherein the second database consists essentially of dynamic inventory that has been returned from prior searches of the first database and is stored in the second database for less than the selected time period.

* * * * *